United States Patent [19]

Briffe et al.

[11] Patent Number: 6,038,498
[45] Date of Patent: Mar. 14, 2000

[54] APPARATUS AND MEHOD FOR AIRCRAFT MONITORING AND CONTROL INCLUDING ELECTRONIC CHECK-LIST MANAGEMENT

[75] Inventors: Michel Briffe; Guy Mitaux-Maurouard, both of Salon, France

[73] Assignee: Dassault Aviation, France

[21] Appl. No.: 08/950,974

[22] Filed: Oct. 15, 1997

[51] Int. Cl.[7] .................................................. G06F 17/00
[52] U.S. Cl. ............................ 701/3; 701/14; 340/500; 340/945; 244/1 R
[58] Field of Search ......................... 701/3, 14, 29, 701/34, 15, 16; 340/945, 971, 500, 505, 6; 244/1 R

[56] References Cited

U.S. PATENT DOCUMENTS

| | | | |
|---|---|---|---|
| 3,612,837 | 10/1971 | Brandau | 701/3 |
| 4,460,943 | 7/1984 | Callahan | 362/276 |
| 4,920,238 | 4/1990 | Aso | 200/6 R |
| 4,996,520 | 2/1991 | Williams et al. | 340/662 |
| 4,999,782 | 3/1991 | BeVan | 364/448 |
| 5,041,982 | 8/1991 | Rathnam | 364/443 |
| 5,086,396 | 2/1992 | Waruszewski, Jr. | 364/454 |
| 5,179,638 | 1/1993 | Dawson et al. | 395/125 |
| 5,216,611 | 6/1993 | McElreath | 364/454 |
| 5,227,786 | 7/1993 | Hancock | 364/454 |
| 5,287,451 | 2/1994 | Favot et al. | 395/164 |
| 5,299,417 | 4/1994 | Page et al. | 60/39.282 |
| 5,331,562 | 7/1994 | McGuffin | 364/449 |
| 5,337,982 | 8/1994 | Sherry | 244/186 |
| 5,340,061 | 8/1994 | Vaquier et al. | 244/175 |
| 5,358,199 | 10/1994 | Hayes et al. | 244/1 R |
| 5,359,890 | 11/1994 | Fulton et al. | 73/178 R |
| 5,408,413 | 4/1995 | Gonser et al. | 364/446 |
| 5,412,382 | 5/1995 | Leard et al. | 340/974 |
| 5,414,631 | 5/1995 | Denoize et al. | 364/461 |
| 5,445,021 | 8/1995 | Cattoen et al. | 73/178 R |
| 5,450,323 | 9/1995 | Maupillier et al. | 701/14 |
| 5,475,594 | 12/1995 | Oder et al. | 701/14 |
| 5,508,928 | 4/1996 | Tran | 364/423 |
| 5,510,991 | 4/1996 | Pierson et al. | 364/434 |
| 5,519,392 | 5/1996 | Oder et al. | 340/995 |
| 5,560,570 | 10/1996 | Pierson et al. | 244/195 |
| 5,574,647 | 11/1996 | Liden | 364/433 |
| 5,606,657 | 2/1997 | Dennison et al. | 395/501 |
| 5,608,392 | 3/1997 | Faivre et al. | 340/967 |
| 5,617,522 | 4/1997 | Peltier | 395/133 |

OTHER PUBLICATIONS

Description of Collins Pro Line 21 Cockpit Instrumentation, 3 pgs., date unknown.

Ditter, Al, "An Epic in the Making", *Commuter World*, Dec. 1996–Jan. 1997, pp. 16–21.

"Collins Tests 3–D Free–Flight Awareness Display", *Flight International*, Jan. 1997, p. 19.

George, Fred, "Introducing Primus Epic", *Business & Comerical Aviation*, Nov. 1996, pp. 116–120.

George, Fred, "Primus Epic Features Evolution of Integrated Systems Plus Concepts Pioneered for B–777", *Show News NBAA '96*, Nov. 10, 1996, 1 pg.

(List continued on next page.)

*Primary Examiner*—William A. Cuchlinski, Jr.
*Assistant Examiner*—Yonel Beaulieu
*Attorney, Agent, or Firm*—Finnegan, Henderson, Farabow, Garrett & Dunner

[57] ABSTRACT

An aircraft includes a system for managing check lists solely by operation of a four-position rocker switch having a center return position. The system includes check list data organized into three levels and automatically displayed upon occurrence of an abnormal condition.

8 Claims, 25 Drawing Sheets

OTHER PUBLICATIONS

George, Fred, "Flying the Future of Avionics Today; Primus Epic Makes Converts at Show", *Show News NBAA '96*, Nov. 21, 1996, p. 16.

Holahan, James, "LCDs, Mice on the Flight Deck!", *Aviation Interntional New*, Midland Park, Nov. 1, 1996, pp. 56–58.

Holahan, James, "Honeywell's Primus Epic: avionics for the millennium", *NBAA Convention News*, Orlando, FL, Nov. 20, 1996, p. 22.

Product Review entitled "New Glass for the Glass Cockpit", 2 pgs., date unknown.

Nordwall, Bruce D., "Collins Pro Line 21 Features Adaptive Flight Displays", *Aviation Week & Space Technology*, Nov. 18, 1996, pp. 63–66.

North, David M., "Gulfstream 5 Sets Pace for Long–Range Bizjets", *Aviation Week& Space Technology*, Apr. 28, 1997, pp. 46–51.

Phillips, Edward H., "Learjet 45 Avionics Includes EICAS Display", *Aviation Week & Space Technology*, Sep. 22, 1997, p. 72.

Proctor, Paul, "Epic Avionics in Flight Test", *Aviation Week & Space Technology*, Sep. 22, 1997, p. 70.

Scott, William B., "Pentium Powers 'Epic'Integrated Avionics", *Aviation Week & Space Technology*, Nov. 18, 1996, pp. 67–69.

Scott, William B., "Need for Value Sparks Avionics Revolution", *Aviation Week & Space Technology*, Oct. 4, 1995, 2 pp.

Trautvetter, Chad, "Next–century Avionics—Honeywell's Primus Epic will change the way pilots work in the cockpit", *Professional Pilot*, Nov. 1996, pp. 96–102.

"Pro Line 21 development driven by human factors", *Vantage Point*, vol. 2, No. 4, 3 pgs., date unknown.

Weisberger, Harry, "Collins readies new avionics in a hurry", *Show News NBAA 95*, Sep. 26, 1995, pp. 15–16.

| FROM: LIROL | | TO: KODOS | | FL 450 | | MACH 0.82 |
|---|---|---|---|---|---|---|
| LFOE.. | LILAN.. | CHW.. | ANG.. | CGC.. | BDX.. | |
| PPN.. | BAN.. | TLD.. | FARO.. | ETRAM.. | GDV.. | |
| DKR.. | GASEL.. | TAROT.. | LIROL.. | KODOS.. | BURGA.. | |

| | FL/ALT | WD COMP | DIST | ETE | FU LB | FF LB/H | FT |
|---|---|---|---|---|---|---|---|
| LFOE | M/IAS | ISA DEV | DISTR | MCS | FR LB | ΔFR LB | ETA |
| LILAN | ▷ CLB | ▷ -25 | 33 | 00:08 | 200 | 2400 | 0:08 |
| | ▷ 250 | ▷ -4 | 5740 | 238 | 6700 | +30 | 06:08 |
| CHW | ▷ 250 | ▷ +2 | 22 | 00:10 | 240 | 2400 | 0:18 |
| | ▷ 0.78 | ▷ -4 | 5709 | 133 | 6460 | +30 | 06:18 |
| ANG | ▷ 430 | ▷ -21 | 93 | 00:24 | | | 0:42 |
| | ▷ 0.86 | ▷ -4 | 5616 | 237 | | | 06:42 |
| CGC | ▷ 430 | ▷ +20 | 80 | 00:19 | | | 1:01 |
| | ▷ 0.86 | ▷ -3 | 5536 | 180 | | | 07:01 |
| BDX | ▷ 430 | ▷ +20 | 53 | 00:12 | | | 1:13 |
| | ▷ 0.86 | ▷ -3 | 5483 | 203 | | | 07:13 |

PRINT  FLT PLAN  ACTIVATE  COMPUTE  △ ▽

ISA DEV ▷
MACH: LRC  MSPD ▷
FL  OPT  MAX CURRENT

M=
FL=
TAS=
Nm/Lb=

LOG 124

RNG

FIG. 11

| NEW | AUTO | MANUAL | FPL LIST | LOAD | AFIS | ☒ |

ORIGIN ▷ LFBD    DEST ▷ LFBO    ALTN ▷ LFBM

| | | | | | |
|---|---|---|---|---|---|
| BASIC WEIGHT | | 22000 | LBS | SHOW MAP | SHOW LOG |
| PASSENGERS | | 10 AT | 200 LBS | FUEL REQUIRED | 3100 LBS |
| CARGO WEIGHT | | 500 | LBS | FUEL AT DEST | 10000 LBS |
| AVERAGE WIND | ▷ | 10 | KTS | TIME TO DEST | 0:25 H:M |
| RESERVES | NBAA | | LBS | T/O WEIGHT | 35900 LBS |
| FUEL | AS REQ | 10220 | LBS | | |
| SPEED | LRC MCRU ▷ | 0.780 | INITIAL | STORE | ACTIVATE |
| CRZ FL | OPT ▷ | 100 | INITIAL | | |

| | | | | | | | |
|---|---|---|---|---|---|---|---|
| RWY | 05 | 23 | 11 | 29 | MORE | MAX WGT | 48500 LBS |
| LENGTH ▷ | 3100 / 10170 | | M/FT | | | BFL | 1790 M |
| SLOPE ▷ | 0.1% | | | | | V1 ▷ | 138 KTS |
| ELEV ▷ | 151 FT | | ] ONH 1012 HPA | | | V2=VR ▷ | 156 KTS |
| BARO PRESS | 1007 HPA | | | | | VFR ▷ | 181 KTS |
| OBSTACLE: HGT | ▷ 0 FT | DIST ▷ | 0 NM | | | VFT ▷ | 205 KTS |
| WIND ▷ | 200 / 10 KTS | TEMP ▷ | 20 °C | | | ACCEL | 0:25 G |
| | | | | | | ATTITUDE ▷ | 12.0 DG |
| FLAPS | 20 | 1D | | | | N1 RED ▷ | % |
| ANTI ICE | OFF | ON | | | | LOC TRK ▷ | 225.0 DG |
| RUNWAY | DRY | WET | | | | TOSA ▷ | 600 FT |
| T/D PROC | NORM | REDUCED | | | | ACTIVATE | |

SID   SAU-3A                                    MORE

TRANSITION ALT ▷ 18000 FT    REVIEW    ACTIVATE

552

RNG
MAP

FIG. 21

APPARATUS AND MEHOD FOR AIRCRAFT MONITORING AND CONTROL INCLUDING ELECTRONIC CHECK-LIST MANAGEMENT

BACKGROUND OF THE INVENTION

1. Field of the Invention

The invention relates generally to aircraft control and, more particularly, to an improved aircraft control interface.

2. Description of the Related Art

Since the days of the Wright brothers, aircraft pilots have been faced with two major tasks. First, the pilot must accurately determine and constantly be aware of the current aircraft status, including location, direction, speed, altitude, attitude, and the rate of change of all of the above. Second, the pilot must be able to quickly and accurately control the aircraft to bring about a change in the above parameters to achieve a desired status of aircraft. In the early days of aviation, the first task was achieved by pilot awareness of visual and tactile stimulation. That is, the pilot looked around to see where he was, felt the wind pressure, and kept aware of acceleration forces pressing his body into the seat and around the cockpit. The second task was achieved by manually operating a mechanical pulley and lever arrangement to bend and pivot the horizontal and vertical control surfaces of the aircraft.

Initial developments to make the pilot's job easier included the provision of a magnetic compass to provide an indication of direction and pneumatic and mechanical instruments including altimeters, turn-and-bank indicators, etc., to provide indications of aircraft altitude and attitude. Subsequent refinements of these early instruments provided more accurate indications of location and altitude through the use of instruments and flight parameter displays such as gyrocompasses and flight directors. Various types of radio signals provided even more accurate determination of the aircraft location through the use of devices such as automatic direction finders (ADF), distance measuring equipment (DME), VORTAC, LORAN, and inertial reference systems (IRS).

Increases in aircraft performance over the years also increased the pilot's workload. To deal with this workload increase, various types of automation were introduced into the cockpit. One device, known as an automatic pilot (autopilot or AP) relieves the pilot of the necessity to provide continuous hands-on input to the control stick or yoke. Another type of automation provided in modern cockpits is the automatic throttle (auto-throttle, or AT). The auto-throttle will maintain a preset aircraft speed by varying the power setting on the engines as the aircraft climbs or descends.

A further refinement in cockpit automation occurred with the introduction of the flight management system (FMS). The FMS, in reality a type of specialized computer, includes a database of pre-stored navigation landmarks known as waypoints. A waypoint may either coincide with an existing ground landmark, such as an airport, or may represent an imaginary point in the sky where two radio signals intersect. The location of these waypoints in stored in the database. The pilot can enter a flight plan into the FMS by selecting a sequential series of waypoints through which the aircraft will travel.

Additional automation has been introduced into the cockpit through various types of automated systems and monitoring functions. Malfunctioning equipment or unsafe aircraft operating parameters will generate a variety of warning lights, audio signals, and even voice signals.

Although the present state of aircraft control systems has provided a vast improvement over the systems of previous eras, significant shortcomings still exist with respect to the goal of providing the safest possible aircraft operation. Many of these shortcomings relate to the vast proliferation of data which is supplied to the pilot and to the inefficient way in which this data is provided. For example, many cockpits have literally hundreds of warning lights scattered all over the cockpit. Furthermore, pilot input devices for specific functions are often dispersed in widely separated positions with insufficient thought given to pilot convenience. In addition, automated systems may provide increased convenience and efficiency in one area but increased pilot workload in another.

One method of coping with the vast amounts of information and procedures required to insure safety is the use of check lists. Each flight phase (power-up, take off, approach, landing, etc) has a set of required procedures which the pilot must methodically execute, either from a paper list or from a more elaborate format using computer stored lists. However, existing methods and apparatus for assisting a pilot with the multitude of check lists required by modern aircraft do not provide the necessary reliability with acceptable convenience.

In view of the above considerations, it is desirable to provide an improved flight information and control system which permit simplified check list management, reduced cost, reduced pilot workload, and improved safety.

SUMMARY OF THE INVENTION

Additional features and advantages of the invention will be set forth in the description which follows, and in part will be apparent from the description, or may be learned by practice of the invention. The objectives and other advantages of the invention will be realized and attained by the apparatus and methods particularly pointed out in the written description and claims hereof, as well as the appended drawings.

To achieve these and other advantages, and in accordance with the purpose of the invention as embodied and broadly described, the invention provides a system for managing check lists in an aircraft, comprising a memory for storing check list data arranged into a plurality of check lists each containing a plurality of items, a color flat panel display device, a multi-position switch, a sensor system for detecting abnormal conditions each corresponding to one check list; and a flight computer coupled to the memory, display device, switch, and sensor system. The computer responds to an abnormal condition detected by the sensor system by automatically displaying the check list corresponding to the warning condition. The computer responds to operation of the switch to the first and second positions by scrolling a screen indicator respectively up and down a displayed list on the display device, to operation of the switch to the third position by calling up a menu of check lists if no list is displayed; and to operation of the switch to the fourth position by displaying the previous check list on a menu.

In another aspect, the invention comprises a method for managing check lists in an aircraft, comprising the steps of storing in a memory check list data arranged into a plurality of check lists each containing a plurality of items, detecting abnormal conditions each corresponding to one of the check lists, responding to an abnormal condition detected by the sensor system by automatically displaying the check list corresponding to the warning condition, responding to operation of a multi position switch to first and second positions by scrolling a screen indicator respectively up and down a displayed list on the display device, responding to operation of the switch to the third position by calling up a menu of check lists if no list is displayed; and responding to operation of the switch to the fourth position by displaying the previous check list on a menu.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one/ several embodiment(s) of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings:

FIG. 11 is a drawing of the NAVLOG window of the MFD;

FIG. 21 is a drawing of the MFD displaying a "flight plan" page;

DETAILED DESCRIPTION OF THE PREFERRED EMBODIMENTS

Figure 1:
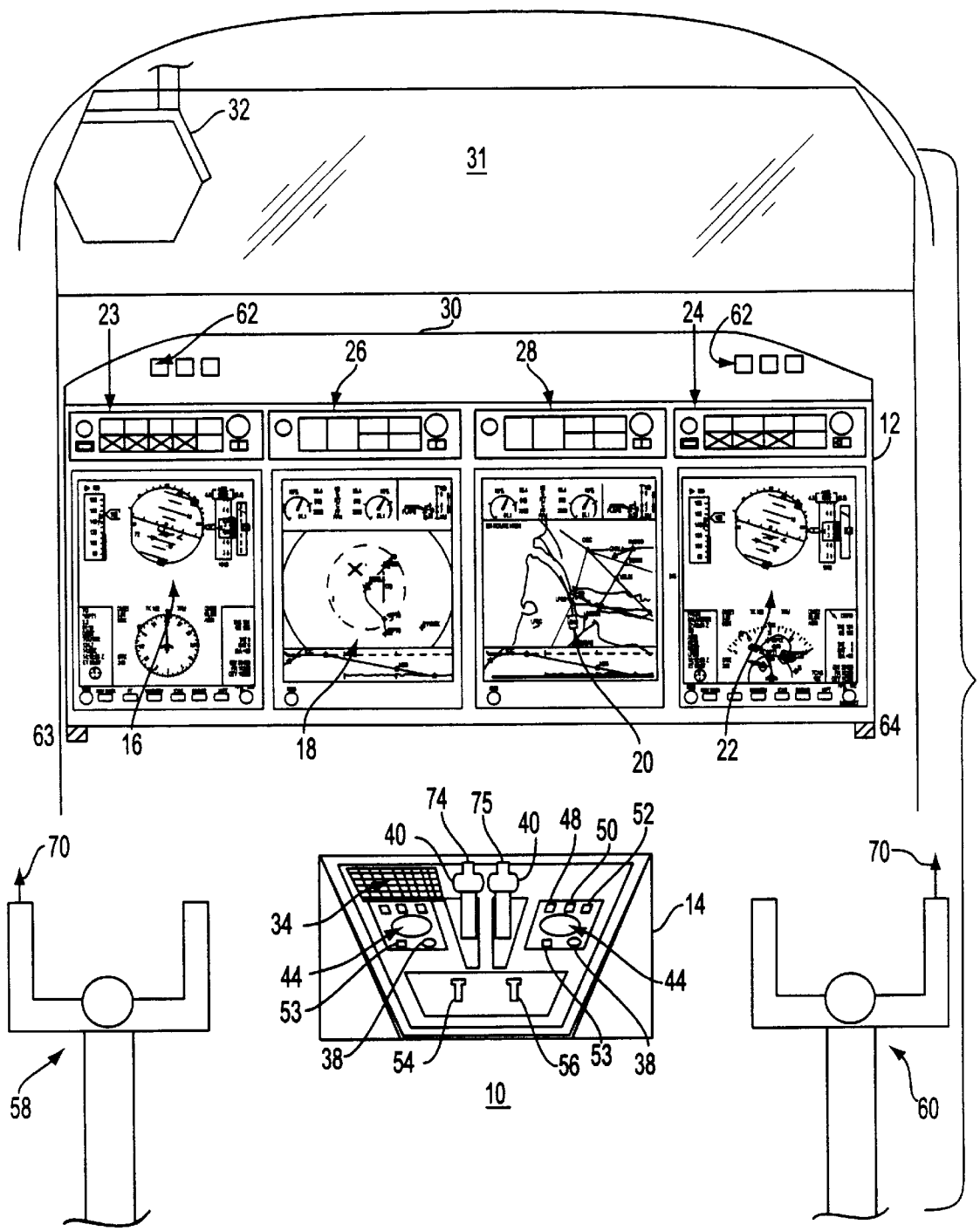
FIG. 1 is a diagram of a flight deck which embodies the present invention.

Referring now to the drawings, FIG. 1 is a diagram of a flight deck 10 for a business jet which embodies the present invention. Flight deck 10 includes an instrument panel 12 and a pedestal 14. Instrument panel 12 includes four 6×8 inch color LCD screens 16,18,20,22. An Autopilot/ Autothrottle (AP/AT) controller 23, 24 and a Multi Function Control Unit (MFCU) 26, 28 are each located above one of the screens 16,18,20,22.

A glare shield 30 is located above the control units 23,24,26,28. Above glare shield 30 and superimposed on the captains' view through a windshield 31 is a Head-up Display (HUD) area 32. Outboard screens 16 and 22 each constitute a Primary Flight Display (PFD). Thus, each pilot has a PFD facing him, with AP/AT controller located above the PFD. All flight information and short-range information is therefore located in the pilot's vertical line of sight to the view through the windshield.

Inboard screens 18 and 20 each constitute a Multi-Function Display (MFD). Each MFD is located in front of pedestal 14, with one MFCU 26 or 28 above each MFD. Both captain and first officer can use both MFDs, which only require coordinated management. This display configuration allows take-off with one MFD out of order.

Instrument panel 12 also includes standby instruments (not shown). The standby instruments may be of conventional type, such as an altimeter, airspeed indicator, attitude indicator, and ILS glide slope/localizer indicator. Alternatively, they could be implemented as flat panel electronic instruments. These instruments are meant only as a back-up to the screen displays.

Pedestal 14 is located between the pilots' seats and has been intentionally reduced in width over the prior art, so as to give better visibility on all screens and to facilitate communication between pilots. Pedestal 14 includes the following controls:

A QWERTY keyboard 34 for each pilot, which includes the alphabet, numbers from zero to nine, one touch ±, decimal, CLR, ENT, SHOW, SPACE, "/", INCREASE and DECREASE keys;

A five-position switch 38 to access check-lists;

Two independent power levers 40, with thrust reverser controls, which include the AT disconnection switchs 74 and the Take off/Go around (TOGA) palm-switches 75;

Two trackballs 44, one for each MFD, which each include four special push-buttons: "Click" 48, "Centered" map 50, "Menu" 52, and "Plus/Minus" 53 (trackballs 44, 46 could also be implemented as a touch-pad, joystick, or other type of cursor control); a lever 54 for speed brakes with three positions (0°, medium, fully extended); and a lever 56 for flaps/slats with four positions (0°, 10°, 20° and 40°).

Keyboards 34, trackballs 44, and switches 48, 50, 52, and 53 provide pilot input to a flight management system (FMS) which performs conventional FMS functions as well as improved functions to be described in greater detail.

The captain's area is fitted with a control yoke 58 including several fast-access controls to be described in detail below. Yoke 58 is the conventional type control handle to receive manual pilot inputs to modify control surfaces of the aircraft and alter the attitude of the aircraft. The first officer's area is fitted with a similar control yoke 60.

Flight deck 10 also includes a simplified upper panel (above the windshield, not shown), which includes only fire panel and lights controls. Lateral panels (not shown) only consist of an oxygen control panel and a disk or CD-ROM driver which gives the capability to load data into the avionics system, such as flight plan, navigation log, radio management. Everything that is necessary for flight is set in front of the pilots' seats and on narrow pedestal 14.

The flight deck is also fitted with three "master caution" lights 62 above each PFD, a reconfiguration box 63 at the bottom left of the captain's PFD, and a reconfiguration box 64 at the bottom right of the copilot's PFD.

Figure 2:
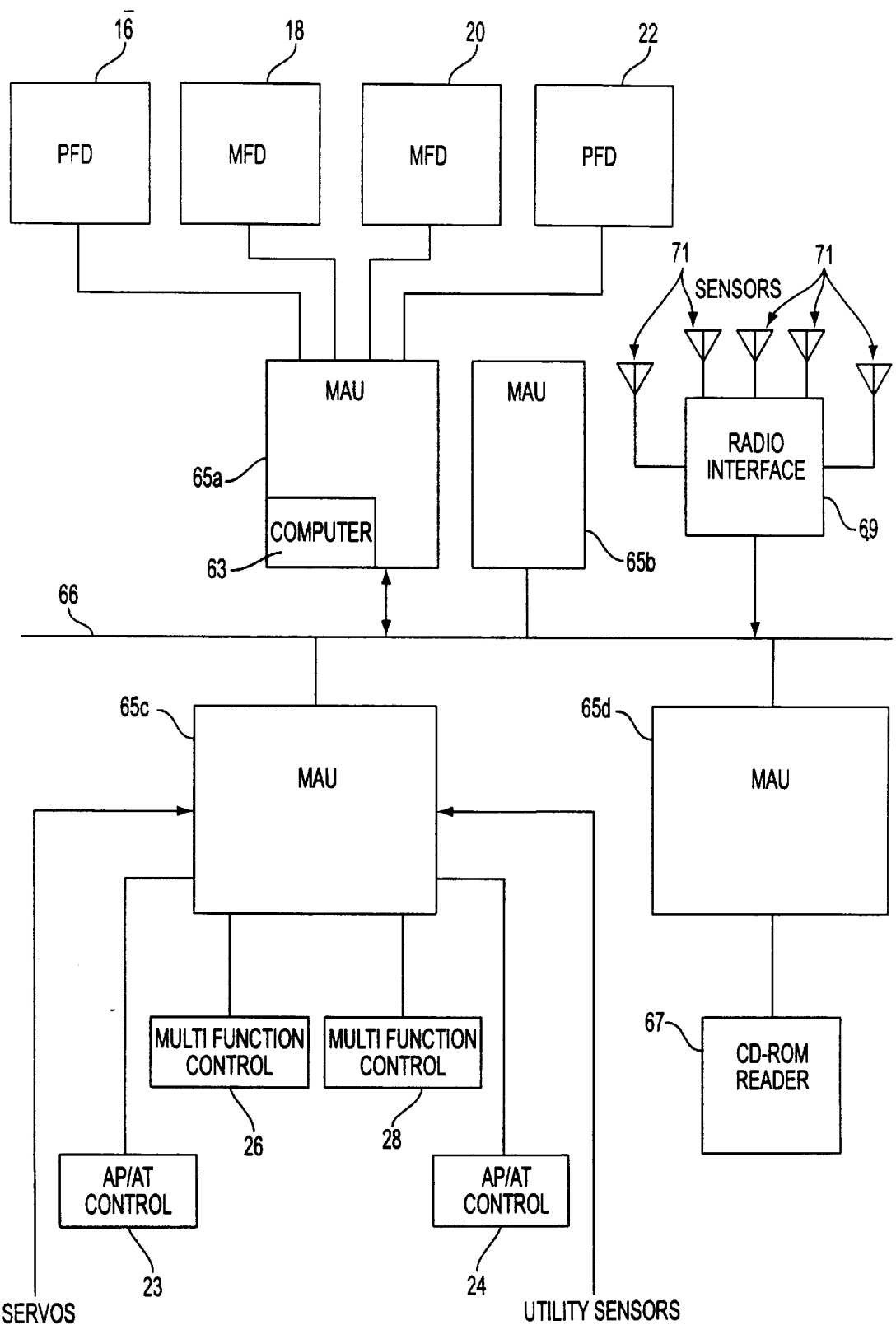
FIG. 2 is an electrical schematic diagram of the components of the flight deck of FIG. 1.

FIG. 2 shows a simplified electrical schematic diagram of flight deck 10. All components of flight deck 10 are preferably implemented as modules of modular avionics units (MAU) 65a–65d interconnected by a high-speed communications bus 66 such as the Avionics Standard Communications Bus of Honeywell. An example is the EPIC system commercially available from Honeywell. Primary processing power of each MAU 65 is provided by a microprocessor, such as a Pentium processor. MAU 65a contains a processor functioning as a flight management system computer 63, including graphics drivers for LCD screens 16, 18, 20, 22. MAU 65b contains communications modules for sensors 71 such as GPS, ADF, VOR, ILS, and MLS receivers and VHF and HF communications transceivers. The sensors themselves are connected to bus 66 via a radio interface unit 69. MAU 65c contains modules for autopilot servos, AP/AT control units 23, 24, MFCUs 26, 28, and aircraft utility sensors. MAU 65d contains memory modules for storing databases and for data input units such as a CD-ROM reader 67.

Other electrical configurations may of course be employed depending on the specific application, as is well-know to those skilled in the art. For example, the electronic components of the flight deck may be implemented in point-to-point architecture, such as the Pro-Line System available from Collins Radio.

Control Yoke

The control yokes 58 and 60 for the captain and the first officer are mounted on control columns of conventional design. The control columns are pivotally hinged to allow fore and aft movement, and the yokes are rotatable left and right. The fore and aft movement of the control column is transmitted to the elevator surfaces to control the pitch attitude of the aircraft, and the rotation of the yoke is transmitted to the ailerons to roll the aircraft. Mechanical, hydraulic, or electrical connections may be used to connect the movement of the pilot controls to the control surfaces. Alternatively, a stick or side stick controller able to pivot along two axes can replace the control column and yoke.

Figure 25A:
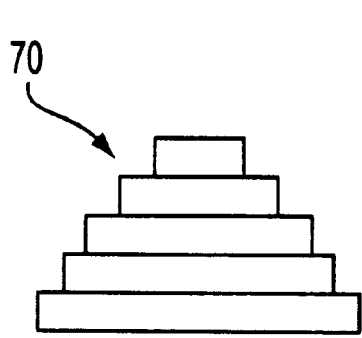
FIG. 25a is a side elevation view of the multi-axis switch.
Figure 25B:
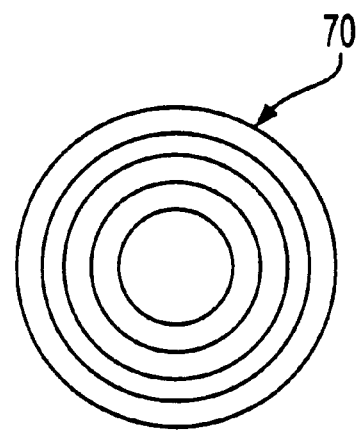
FIG. 25b is a top plan view of the multi-axis switch.

Several electrical controls are mounted on the yoke or stick. Conventional controls (not shown) include a push-to-talk switch to activate communications radio transmitters, a push-button autopilot disconnect switch, and switches to electrically trim the aircraft. A five-position multi-axis control switch 70 is also included. Switch 70, shown in more detail in FIGS. 25a and 25b, is mounted on yoke 58 and 60 and is thumb activated. This switch is used to increase and decrease the value of the heading and the flight path slope followed by the autopilot a manner to be described later in greater detail. Sideways motion changes the heading or track, and fore/aft motion changes the slope. Pressing the switch in its central position generates an ENABLE signal which selects which course and slope is followed by the A/P. Further details of multiaxis switch 70 are given in the section discussing the autopilot.

Navigation Sensors

Flight deck 10 uses receivers for the NAVSTAR and GLONASS global positioning system satellites (GPS) and inertial reference sensor (IRS) platforms as principal navigation sensors. GPS receivers compute the aircraft's position from radio signals transmitted from a constellation of satellites. To provide greater accuracy, for example, when an aircraft is landing in poor visibility, differential GPS (D-GPS) is employed, using a separate receiver to receive correction information from a ground station to increase the accuracy of the position solution derived from satellite signals.

Another navigation sensor is the IRS, which employs sensitive gyroscopes to measure the acceleration of the aircraft along three axes. By knowing the point of departure and the magnitude and duration of acceleration in a given direction, the IRS can compute the current location of the aircraft.

Traditional navigational aids ("navaids") are also used to supplement GPS and IRS. These typically consist of various types of ground-based radio stations which transmit signals carrying encoded information, and an airborne receiver which interprets the information. These range in complexity and cost from the automatic direction finder (ADF) which points towards a single non-directional radio beacon on the ground, to LORAN which uses a worldwide chain of transmitters to give exact location of the aircraft. VOR, VORTAC, and VOR/DME give a bearing from a known station, and with the appropriate equipment also give the distance from the station. ILS (instrument landing system) and MLS (microwave landing system) use specialized transmitters located at many airports to enable landing in poor visibility. All the traditional navaids require ground transmission stations which are expensive to maintain and operate, and several are likely to be phased out in the future.

In instrument panel 12, all navigation sensors, including VOR/DME, GPS, ADF, ILS, MLS, IRS, LORAN, etc., are coupled to the system via bus 66 and are provided as inputs to the FMS computer 63, residing as a module in MAU 65a. The FMS thus becomes the sole navigational interface with the pilots, and conventional navigation aid receivers such as the VOR/DME receiver become simple sensors for the FMS, without providing direct pilot access to the deviation from a VOR radial as in a conventional FMS. Guidance on a VOR radial remains possible through the FMS by choosing the VOR as a "TO" waypoint and by selecting a desired track to that waypoint. The sensor that will provide guidance information in this particular case, however, will be GPS, if serviceable. Nevertheless, in addition to the permanent bearing indication from the FMS, VOR and ADF, bearings can be displayed on the PFD in order to survey an FMS procedure. Both pilots can access the VOR, DME, and ADF. Alternatively, it may be preferred to provide access for precision approach sources (DGPS, ILS, MLS, etc.) direct to the autopilot and display devices.

Communications Transceivers

Two VHF radio transceivers are provided, COM1 and COM2, in addition to the HF radio transceivers. Additional VHF transceivers may be provided. These transceivers (not shown) can be tuned manually, or can be tuned by "pointing and clicking" with trackball 44 on a frequency in a digital map displayed on the MFD or the PFD.

A radar transponder is also provided. It is used to amplify and encode a signal returned to a ground-based radar, so that the ground controller can identify the radar return from a code issued to the pilot and entered in the transponder. The altitude of the aircraft is also sent back to the radar, to facilitate aircraft separation.

Satellite communication (SATCOM) may also be provided, to permit telephone, fax, and other types of data transfer from and to the aircraft, by way of orbiting satellites.

Display Screens

PFD

Figure 3:
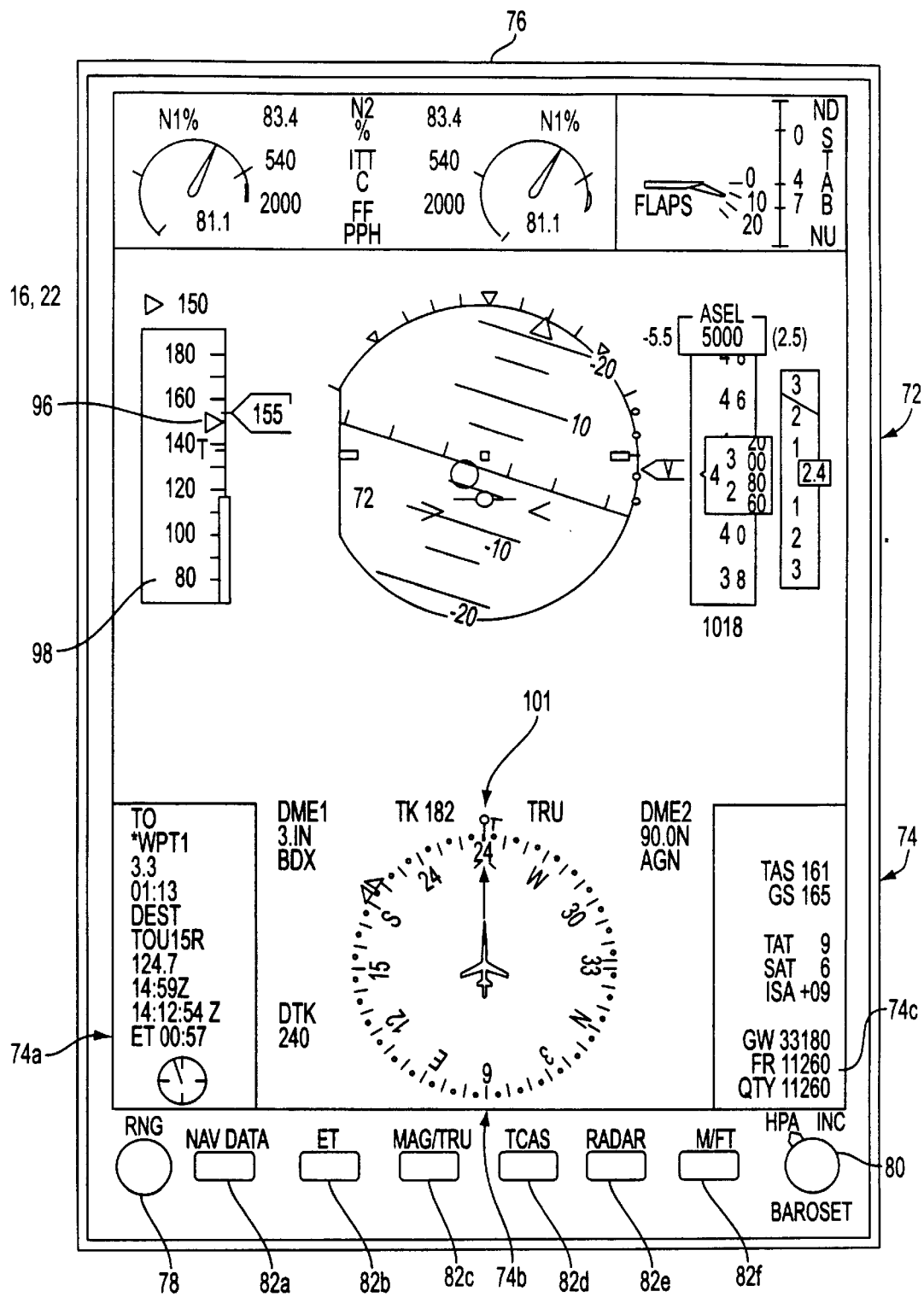
FIG. 3 is a drawing of the display window of the Primary Flight Display (PFD) PFD of FIG. 1, with the "full rose" format.

Most of the information provided to the pilots in flight deck 10 is displayed on PFDs 16, 22 and MFDs 18, 20. Each PFD is driven by a graphical driver and processing module located in MAU 65*a*. Preferably, it encompasses at least a 6×8 inch color liquid crystal display (LCD) screen. As shown in FIG. 3, each PFD principally displays an attitude direction indicator (ADI) 72 in the middle part of the screen and horizontal situation indicator (HSI) 74 in the lower part. Basic engine parameters are also displayed in an engine area 76 (upper portion) in case of a MFD failure.

Two rotary knobs 78, 80 and six push-buttons 82*a*–82*f* are located at the bottom of each PFD. Knob 78 is a "RANGE" rotary knob to adjust the range scale of the HSI in preset increments, and includes a push-to-toggle function to switch between map and plan display formats of MFD 16,22. Knob 80 is a "barometric setting" knob to enable baroset adjustments to the altimeter. Button 82*a* labeled "NAV DATA" provides display of a navigation data screen in a manner to be described later in greater detail. Button 82*b* labeled ET provides elapsed time functions on a chronometer. Button 82*c* labeled "MAG/TRU" switches between magnetic and true heading or track reference on all displays. Button 82*d* displays TCAS symbology in place of the current horizontal situation format on HSI 74. Button 82*e* labeled "RADAR" displays a weather-radar image on HSI 74, and button 82*f* labeled "M/Ft" selects an additional altitude display expressed in meters. If preferred, some or all of buttons 82*a*–82*f* may be implemented as menu choices or soft keys.

Figure 4:
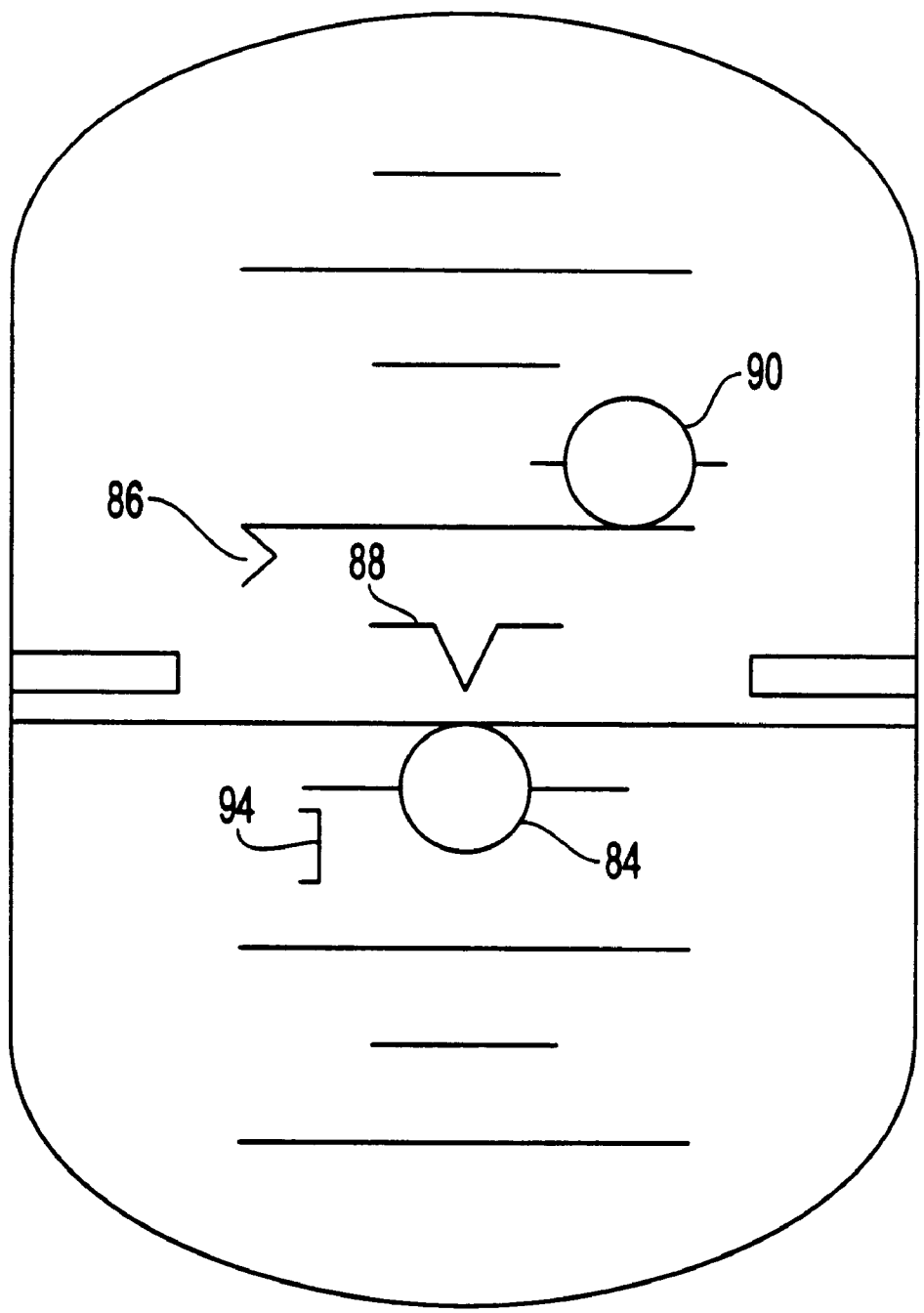
FIG. 4 is a detailed drawing of the attitude direction indicator of the PFD of FIG. 4.

ADI 72 displayed in PFD 16, 22 and shown in more detail in FIG. 4 displays conventional information, but further includes an aircraft velocity vector (flight path angle) reticle 84, an "acceleration rate along path" reticle 86, pitch reticle 88, a flight director reticle 90 showing desired aircraft velocity vector, and a speed reticle 94. As set forth below, these reticles provide the capability to fly the aircraft using slope (path) guidance instead of pitch, in the same manner as conventional HUD symbology.

Figure 6:
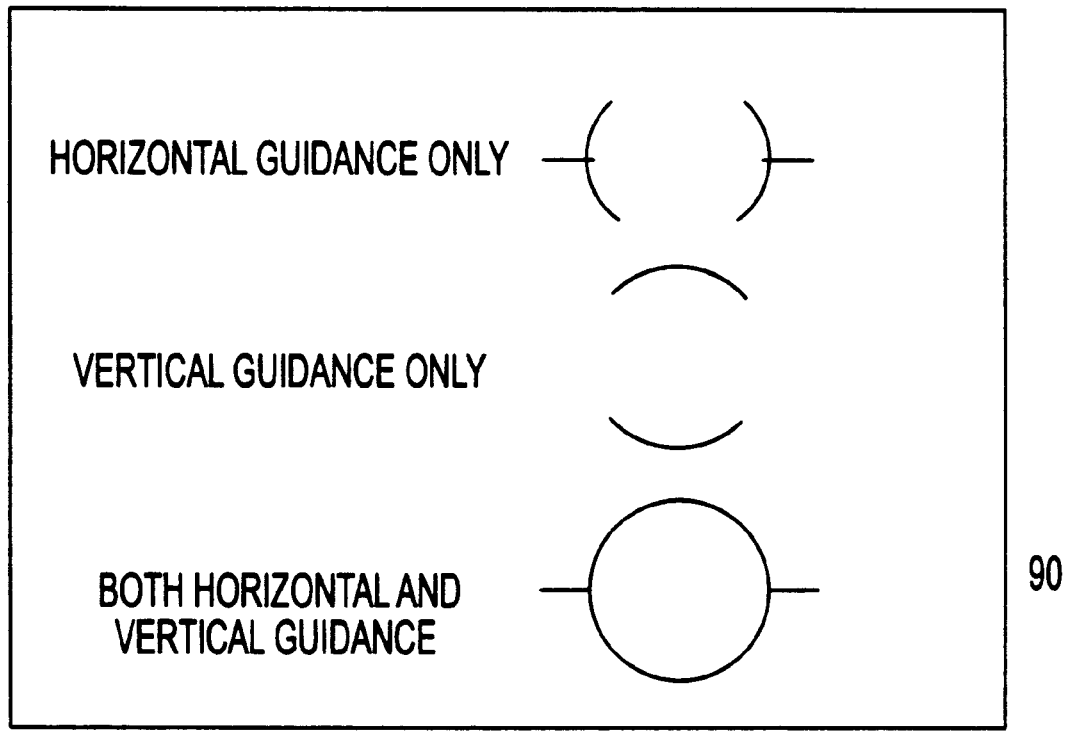
FIG. 6 is a drawing of the flight director symbol.

Referring to the drawing of FIG. 4, a flight director reticle 90, which is computed by the autopilot function of computer 63 and can be displayed on PFD 16, 22 and on the HUD 32, is a representation of the path desired aircraft velocity vector, that is, the desired flight path angle, as calculated by the autopilot to achieve the desired aircraft trajectory, or slope. As shown in more detail in FIG. 6, reticle 10 consists of two reticles, each one made of a pair of quarter-circles. One reticle is devoted to the vertical guidance and the other one to the horizontal guidance. Those are always displayed magenta. FPA reticle 84 must be set within the quarter-circles for the guidance to be followed correctly. Reticle 90 is always displayed if the AP is coupled or if a higher mode of the AP is selected and is active. The shape of flight director reticle 90 is identical in both PFD 16, 22 and HUD 32.

Flight path angle (FPA) FPA reticle 84 consists of stylized aircraft symbol which shows the slope of the current path of the inertial velocity vector of the aircraft, as supplied by the inertial reference system (IRS). Lateral deviation of this reticle due to slip-skid or to drift is neither computed nor displayed in this reticle. To maintain coordinated flight by adjusting the slip angle β to zero manually with rudder control, a classical slip-skid indicator (not shown) remains available at the top of A.D.I.

Acceleration reticle 86 consists of a chevron ">" which moves vertically on an imaginary line running from top to bottom of ADI 72. It provides an analog indication of acceleration rate along the flight path.

Speed reticle 94 provides speed guidance during flight phases such as the approach. It consists of a bracket "]" on the left of FPA reticle 84. To hold the desired speed, the pilot aligns the FPA reticle 84 with bracket 94. The difference in vertical position of reticle 94, above or below reticle 84, indicates the error between current speed and desired speed, as specified by the FMS. In addition, alignment of longitudinal acceleration chevron 86 with reticle 84 and 94 ensure that the speed will remain constant. Of course, the required speed depends on aircraft's configuration, and will be manually set by pilot using the autothrottle (AT). The pilot can refer to parameters computed by the FMS to compute a required landing speed ($V_{ref}$), given the approach slope, aircraft weight, temperature on ground, and flaps configuration. A corresponding cyan colored bug (marker) 96 is displayed on an air speed indicator tape 98 (FIG. 3). The pilot simply selects the desired speed value on AT control 23, 24, and the system will provide him with the corresponding bracket 94 in ADI display 72.

HSI 74 (FIG. 3) displays short-range navigation information in the lower portion of PFD 16, 22. It is divided in three areas, which are a "left window" 74*a*, a "pure horizontal situation" 74*b*, and a "right window" 74*c*.

The "left window" provides FMS navigation information which can be displayed in two different formats. First is a "TO-DEST" format, shown in FIG. 3, displaying a "TO" waypoint with its name, distance and time to go to next waypoint, plus "DEST" airport with name, distance and ETA. Second is a FROM/TO/NEXT format displaying the name of these three points plus the time of overflight of the "FROM" waypoint and the expected arrival time at the "TO" waypoint. The pilot can toggle between both formats using the "NAV DATA" push-button 82*a* at the bottom of PFD.

The "left window" also provides the present time, in magenta, and a chronometer with analog and digital values, only used to compute elapsed time. A first push on the "ET" push-button 82*b* makes the chronometer appear and start from zero. A second push stops it. A third push restarts it from zero.

The "pure horizontal situation" area 74*b* is located at the center of HSI 74 and can be displayed in three different formats. FIG. 3 shows the first format, which is a "full rose" format (conventional HSI symbology) displaying a full 360 degree compass rose centered on an aircraft symbol. On request, bearings to selected points can be displayed in the rose. FMS or ILS Course/deviation is always displayed as a bug 101 while in this format. The ILS course deviation is displayed when a precision approach is selected on the AP controller, or when an ILS frequency and course are manually tuned. ILS course deviation can also be automatically selected when passing within 30 miles of the initial approach fix (IAF).

Figure 5:
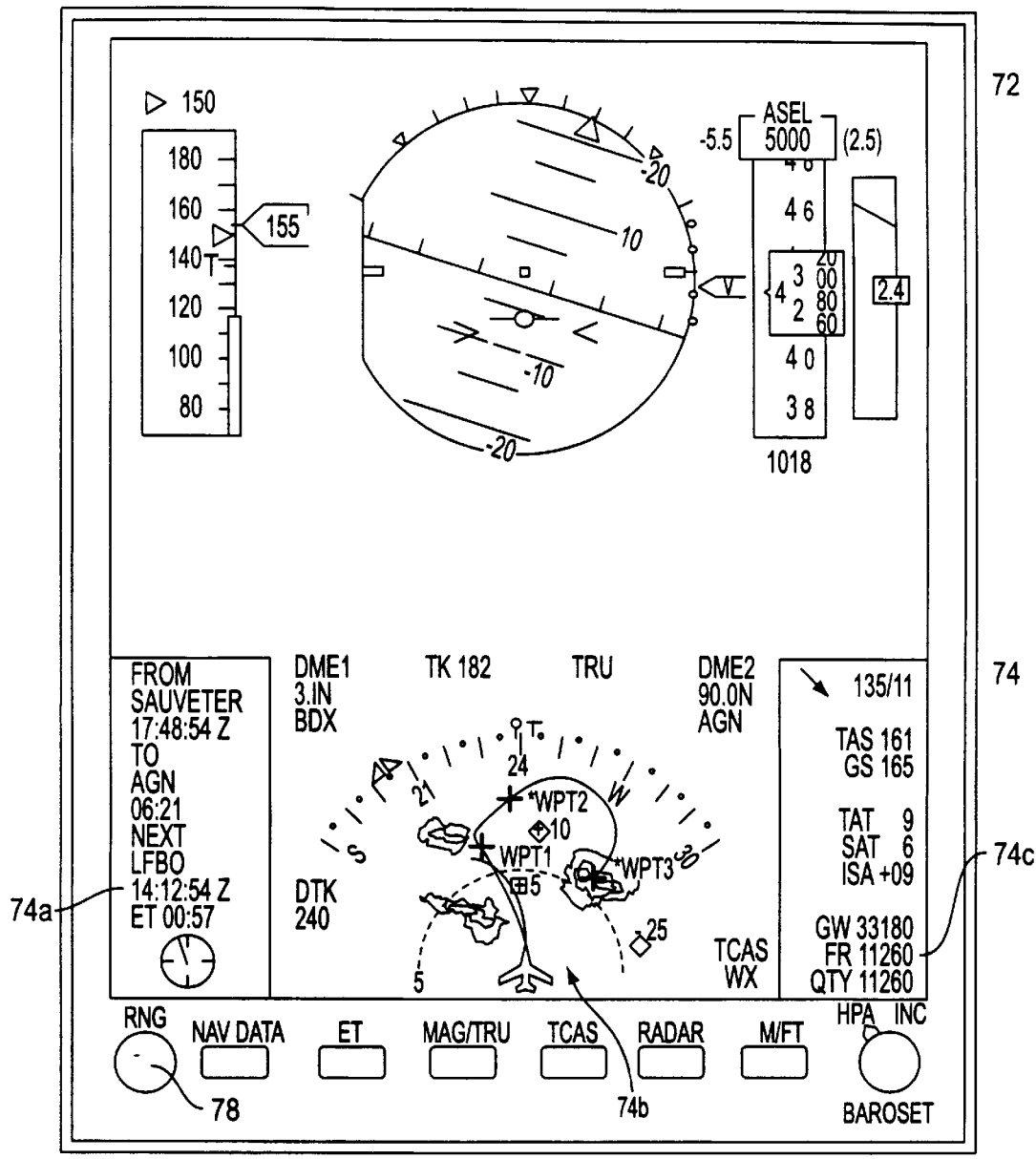
FIG. 5 is a drawing of the display window of the PFD of the flight deck of FIG. 1, with the "arc" format.

The second HSI format is an "arc" format, which displays a ±60 degrees sector in front of the aircraft and is shown in FIG. 5. This format provides the position of waypoints that are inside the selected range-scale entered with rotary knob 78 at the planned path of the FMS flight plan. FMS bearing and course deviation are always displayed in this format.

Figure 7:
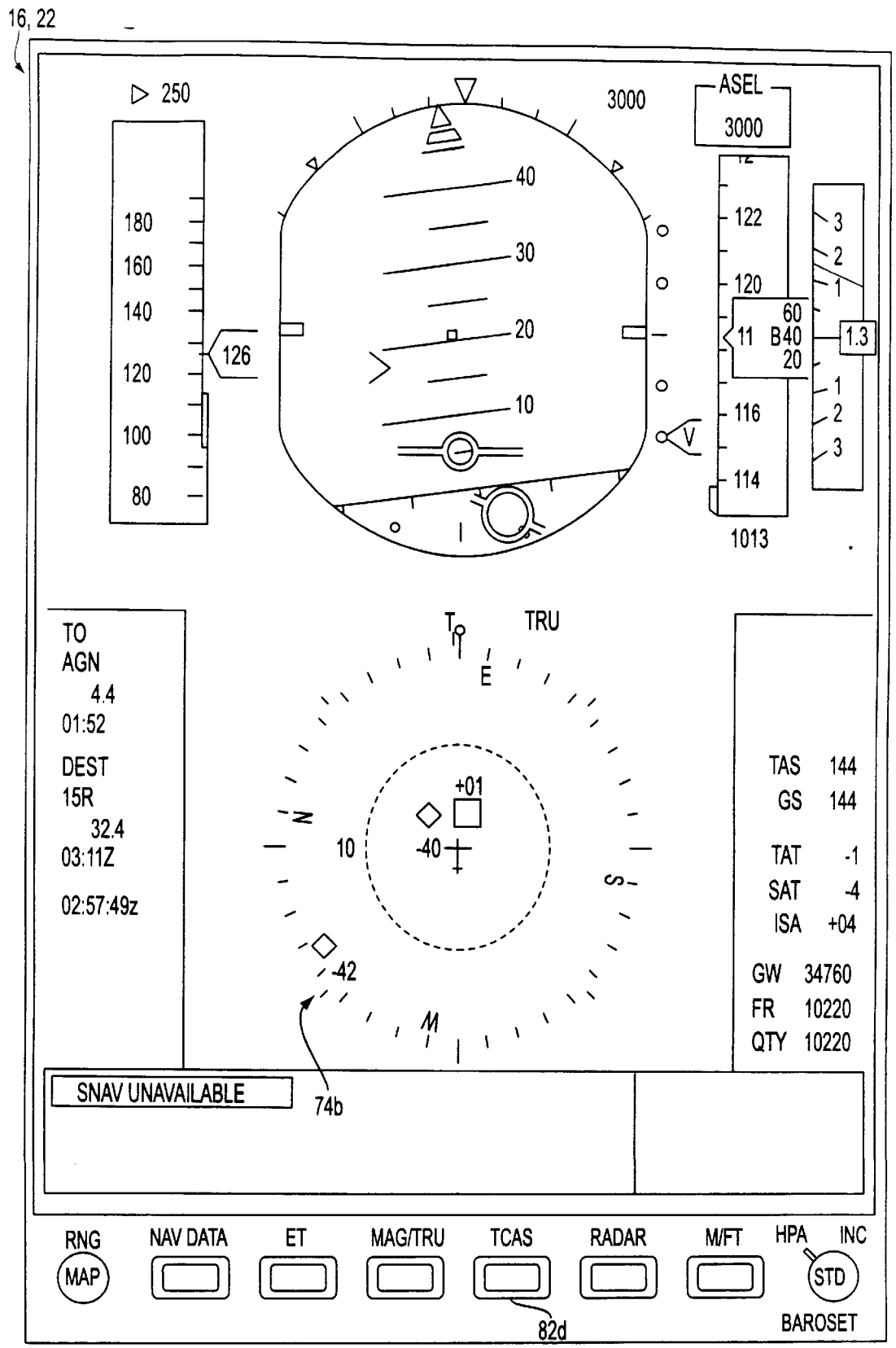
FIG. 7 is a drawing of the display window of the Primary Flight Display (PFD) PFD of FIG. 1, with the TCAS format.

Area 74b will display the full Traffic Collision Avoidance System (TCAS) format (FIG. 7) either automatically in case of traffic alert or by pressing the "TCAS" push-button 82d. The TCAS display is a full 360 degree rose centered on the aircraft. The range of the TCAS display can be adjusted using the rotary knob 78 on the left bottom of PFD 16, 22. A second pressing of the "TCAS" push-button 82d of the PFD calls back the previous HSI format.

VOR and ADF bearings can be displayed on the PFD in addition to the bearing indication of the FMS, as a backup. Both pilots can access the VOR, DME, and ADF.

ILS approaches and differential global positioning system (D-GPS) are some of the approach options of the FMS functions of computer 63. Both are automatically set up by computer 63 without requiring pilot entry of frequencies, except in abnormal operations, when it is possible to manually tune an ILS frequency and course by using the MFCU.

In addition, the pure horizontal situation area 74b of HSI 74 displays the following information: distances to DME 1 & 2 with name of these radio navigation aids, labels indicating the radio navigation aid represented by each needle, a label indicating which of MAG/TRU references is used, desired track or preselected track symbol when the AP is in the corresponding mode, and current track.

The "right window" 74c of HSI 74 provides: air data computer (ADC) information, including TAS, TAT, SAT, ISA and GS; weights, including GW, FR and QTY; wind direction and velocity; and landing runway elevation, which starts flashing when passing TOD to remind the pilot to check the pressurization system. Power-up value of landing runway elevation is 0 (sea level), but the pilot can modify it. If the pilot does not modify the zero value when passing to within 30 Nm of the destination airport, the value of the destination airport runway elevation from the stored data base is automatically displayed and flashes for 10 seconds. The pilot can subsequently modify this value.

All information in this window is permanent, except landing elevation which is displayed only once when manually entered, or when a destination airfield is selected and the aircraft is less than 200 miles from the destination.

MFD

In prior art flight decks, the aircraft crew was required to manage the flight and perform path modification by using the control and display unit (CDU) of the FMS, which involved manually typing in desired waypoints and other data. This was a boring, fastidious task, which could affect safety in unpredictable ways, to the point that some aircraft operators prohibited the use of the CDU below an altitude of 10,000 ft. (FL100). To remedy this problem, a method to manage the FMS functions by using the MFD has been developed, eliminating the previously existing CDU on the flight management system unit.

The MFDs 18, 20 are truly the "workstations" of the flight deck. They are used for managing the flight, carrying out flight path modification, and checking aircraft systems and sensors availability. The corresponding procedures involve the intensive use of track-ball 44 controlling a cursor of MFDs 18, 20 and, in a less important manner, use of keyboards 34. Alternatively, the functions of keyboards 34 may be replaced by a direct voice input, and the function of the trackball could be performed by other cursor control devices, such as a touch-panel.

Figure 8:
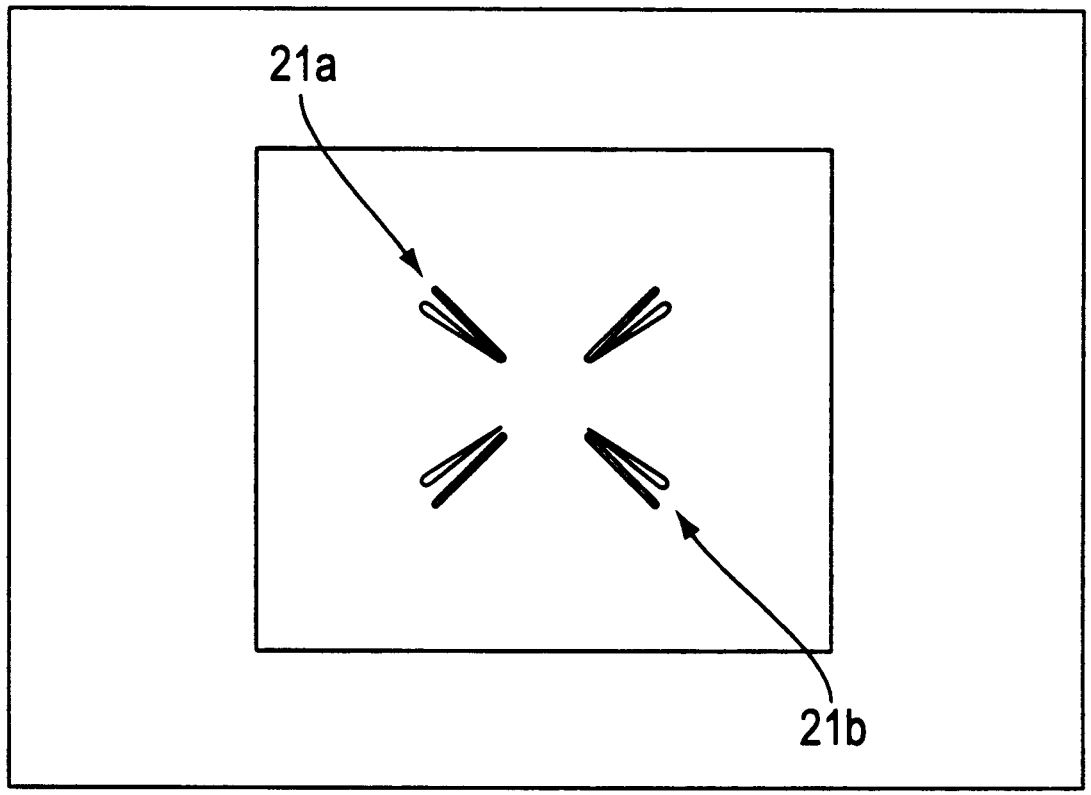
FIG. 8 is a diagram showing the configuration of the cursors of the captain and first officer displayed on multi-function display units (MFDs) of the flight deck of FIG. 1.

An important aspect of the design of MFDs 18, 20 is the ability for each pilot to access both the right MFD 20 and the left MFD 18 from each seat, using a distinctive cursor, as shown in FIG. 8. However, both MFDs provide the same options and are coupled to synchronized FMS processors.

Both MFDs are synchronized so that, for example, when the captain is working on an enroute high altitude chart on MFD 18, the first officer can work on the same chart in his own MFD 20, using a different range scale or type of format. However, the pilots can also work together on the same page, on the same MFD, each one using his own trackball 44, to move his own cursor, and his own keyboard 34. The principal constraint to joint access of the MFD is that once a modification has been initiated using one cursor, it must be finished with that same cursor.

Access to each MFD 18,20 is implemented by a "cursor skip" function, which selectively permits each cursor to move about each MFD. In the preferred embodiment, the cursor skip function is selectively implemented by trackball velocity. For example, if the captain slowly operates his trackball 44 to move his cursor to the right, the cursor will stop at the right edge of MFD 18 to prevent inadvertently "skipping" to MFD 20. Subsequent slow movement of the trackball to the right will not result in further movement of the cursor. However, rapid operation of the captain's trackball to the right will cause the captain's cursor to "skip over" to MFD 20. The captain can then use his cursor and related buttons to implement any feature available on right-hand MFD 20. Similarly, the first officer can selectively move his cursor to left-hand MFD 18.

The cursor skip function could, of course, be implemented using a selector other than trackball speed. For example, a dedicated push button could be provided, operation of which would be required to permit "cursor skip" to the other MFD. Moreover, the cursor skip function could be implemented over more than two flat panel displays.

The following functions are redundantly included in both screens to permit a flight to depart even if one MFD is inoperable: display engine parameters and warning/caution messages; display all aircraft electrical, fuel, air conditioning, hydraulics systems; display horizontal situation and vertical profile; manage FMS and AFIS; manage normal and abnormal check-lists; and display general maintenance items in flight that can be easily understood by the crew.

The functions of the MFD are founded on the basic idea of displaying desired portions of at least two data bases stored in MAU 65d (FIG. 2), highlighting (or "capturing") specific features of the displayed data with the cursor, and "selecting" the captured features to permit modification of the displayed feature or storing into a flight plan. The first data base is a geographic map data base which provides basic geographic features of a standard paper map, or chart, including terrain elevation. This database, which may be the same as utilized in the Enhanced Ground Proximity Warning Systems (EGPWS), is stored in a first portion of system memory. The EGPWS database is commercially available from the Sundstrand Corporation.

The second database is an aeronautical information database, which includes a complete list of available navigation aids such as VOR, GPS, ILS, MLS, ADF, as well as airports, airways, intersections, reporting points, etc. The aeronautical information database includes locations and frequencies of each navaid. It is obtained from standard sources such as Jeppesen Publications, and is stored in a second portion of system memory.

Figure 9:
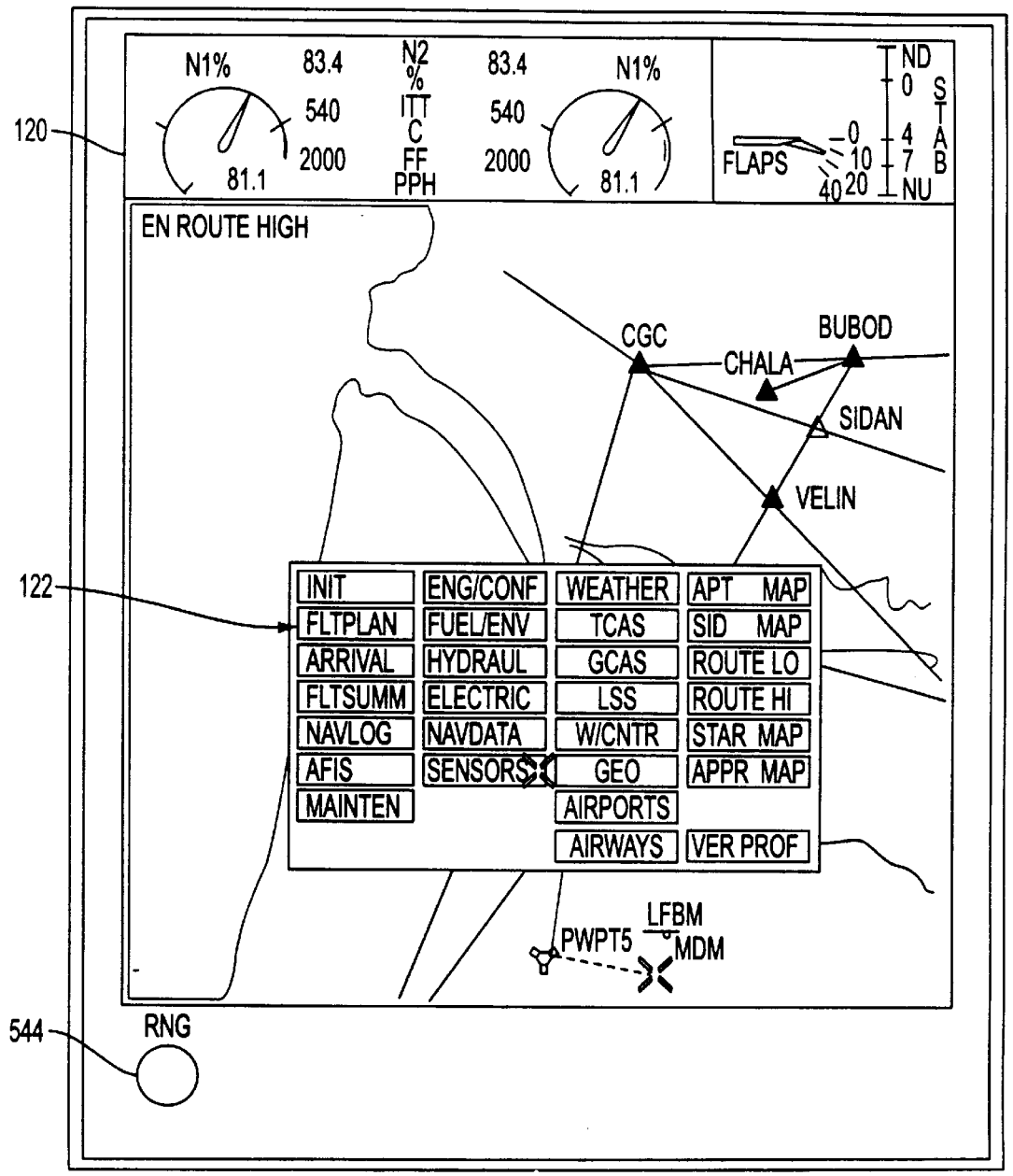
FIG. 9 is a drawing of the main menu of the MFD.

The background or default image of the MFD is the horizontal situation, consisting of the superposition of data from the aeronautical information database (such as navaid location) on geographic map data, such as water land/ boundaries. However, the MFD can display several function pages thanks to a menu driven system. The surface of the screen is divided into six windows of 1/6 the total screen size. The different windows displayed will encompass a total size that is a multiple of 1/6 the available surface, i.e. 1/6, 1/3, 1/2, 2/3, 5/6 and 1 times the available surface. The horizontal situation is displayed on the part of the screen unused by the window (s) requested by the pilot. Furthermore, one MFD 18,20 includes a permanent ENGINE/TRIMS display 120 which continuously occupies the top 1/6 as shown in FIG. 9.

The trackballs 44 and switches 48, 50, 52 are the main means to operate the MFD. Operation of the cursor involves the actions of cursor "capture" and "selection", commonly known in the personal computer world as "point and click." For example, when the pilot is interacting with the HSI, the cursor is movably superimposed upon points on the map by action of the trackball. Certain of these points on the map constitute special positions recognized by the system: RNAV points, routes, airports, and so on. When the cursor is superimposed upon such points, the point is "captured", that is, the background around the captured point becomes brown, and the cursor is displayed behind this background. To "select" the captured point, the action button 48 of the track-ball is operated. This causes data stored for this point in system memory to appear as an information window displayed at the place of the cursor. From this moment, the pilot can begin a modification of a parameter displayed in the window, using the keyboard, for instance. It is also possible to designate soft keys and labels, which will cause the corresponding function or option to be selected.

Which parameters are displayed for the point depends on the category of the symbol corresponding to the designated point. The category of the symbol itself depends on the background of the displayed chart, but not on the magnification. A first click on the symbol displays a window beside it. A second one outside this window erases it.

There is no priority given to either pilot in using either MFD. Each pilot can work with his cursor on both MFD, and both pilots can also work together on the same MFD, or on the same function on different MFD. In this latter case, the system takes into account the chronological order of actions. There is only one exception: If one pilot has already begun a modification, the other pilot cannot interfere on this parameter as long as the procedure is not terminated. But the second pilot can fill another parameter on the same MFD. Hence, it is possible to get both cursors on the same display. The cursors for each pilot are graphically different, as shown in FIG. 8. Both cursors have the same size, but the angle between the cursor legs is different so as to be able to differentiate them even when superimposed. For instance, 21a is the captain's cursor and 21b is the first officer's cursor.

MFDs have provisions to let the pilots modify selected parameters displayed as a window. A small triangle is displayed in front of each parameter that is likely to be modified. When the cursor captures one of these parameters, its background becomes brown and a modification can take place by entering the new value with the keyboard. While being modified, the parameter is displayed cyan with cyan framing. When the modification is completed, the pilot to presses the "ENT" key, or clicks the button of the trackball. If the pilot presses "ENT" or clicks without entering data, the cursor automatically skips to the following parameter. It is possible to exit the modification process by double-clicking the button of the track-ball, so that the system returns to the previous status.

The main menu 122 of the MFD can be accessed directly by using devoted push-button 52 located on the trackball (FIG. 1) to directly call up the main menu of the MFD, as shown in FIG. 9. The main menu 122 includes a plurality of entries. Clicking on one of these entries displays the corresponding page on the MFD. The system always accepts the last pilot choice and erases all that is necessary so as to be able to display the requested page. Some windows such as engine performance, or the check-list, are not erased. The erasures are first carried out at the bottom of the MFD. If two aircraft systems pages are requested, the horizontal situation indicator is no longer displayed on the MFD, for lack of sufficient room.

The main menu of FIG. 9 has four columns. The first column provides access to FMS management pages. The second column includes mainly aircraft systems windows. The third column controls the display of sensors data, for example, selection of a weather radar image to be superimposed on the horizontal situation display. The fourth column controls access to various charts and maps, which in current aircraft are usually provided on paper, such as by Jeppesen publications.

Figure 10:
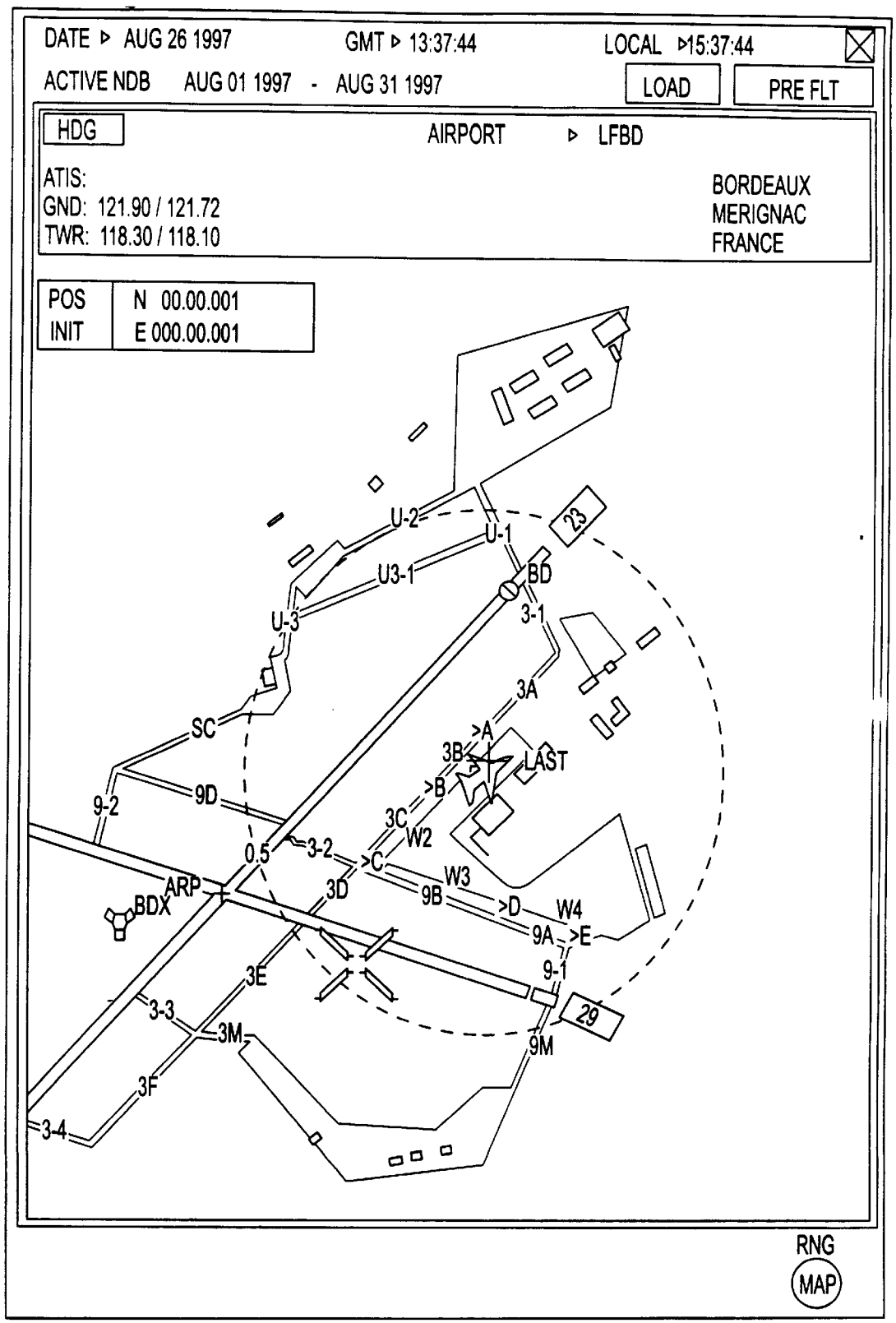
FIG. 10 is a drawing of the INIT window of the MFD.

A description of some of the entries of the Main Menu is set forth below.
First Column This column mainly includes Flight Management System pages. These pages allow the pilot to perform the following procedures:
INITIALIZATION This page is selected by the "INIT" label in the main menu. As shown in FIG. 10 it encompasses the entire screen, except the area occupied by the permanent engine/trim window. It consists of one window with dates and times and of the airport chart. This latter is initially displayed in a 1 NM range-scale, north oriented. It lets the pilots check and set current date and time and the database's effective date, check position on the aircraft on apron and the FMS reference position, load contents of CD-ROM to update the database if necessary, and tune the MFCUs on airport frequencies by clicking first the desired station frequency and then the "TUNE 1" or "TUNE2" softkey.

The NAVLOG page (FIG. 11) provides all information necessary for fuel and time management, including:

Check mission preparation

Generate reminders of flight conditions, planned fuel consumption and flight time for each leg Automatic updating of these values according to current conditions Carry out a "what-if": asking the system to display the consequences of changing one or several flight conditions.

Make research of optimal flight conditions

This page lets the pilots modify the NAV LOG manually, only for the vertical plane. The window size is the same as for the FLT PLAN window. It further provides the usual navigation log with a list of navigation legs for which are given the following parameters:

"To" waypoint with its name

Required flight level or altitude on the leg

Required Mach and TAS on the leg

Wind component on the leg (plus if back) and delta with ISA temperature on the leg Distance and distr (total distance of leg and remaining distance after this leg)

Time on the leg (ETE, in hours and minutes) and true track

Fuel used on the leg and fuel remaining on the last waypoint of leg (in Lb.)

FF on the leg and DFR (delta fuel remaining, i.e. difference between FR planned in mission preparation and currently computed FR. This item is not filled if flight path has been modified.)

Flight time (time that has been done when reaching the waypoint) and

ETA on this waypoint.

Note that all planned values (ETE, FU, FR, FF, Δ_FR, FT, ETA) are continuously updated by the FMS computer 63 regarding: current weight, detotalizer values, position on the path, current FL and Mach number, current wind and temperature. When the aircraft reaches the end of the leg, all parameters of the leg are set either to the average value computed for the leg (FL/ALT, M/IAS, WD COMP, ISA DEV, ETE, FU, FF) or to the actual value when passing over the waypoint at the end of the leg (FR, Δ_FR, FT, ETA).

If any modification of FL/ALT or M/IAS or WD COMP or ISA DEV occurs, the modified value is instantaneously passed on to following legs for which the same value of FL/ALT or M/IAS was planned. No automatic pass occurs for WD COMP or TEMP. All predicted parameters (ETE, FU, FR, FF, Δ_FR, FT, ETA) of the relevant leg and of the following legs are erased. Finally, "CLEAR" and "COMPUTE" soft keys are displayed under the log. "CLEAR" allows the pilot to clear the modification and go back to previous status. "COMPUTE" re-starts a computation of predictions regarding the new assessments, respecting the eventual mandatory times. As soon as new predictions are displayed, the "COMPUTE" soft key is removed and an "ACTIVATE" one is displayed. Pressing this key activates the new values of FL, ALT and M/IAS in the vertical flight plan.

The page also provides the following keys:

PRINT

FLT PLAN (to return to FLT PLAN page if one comes from it)

Scroll-up and down keys, 124 so as to scroll the entire LOG. The scroll soft keys are displayed only if the number of waypoints is too large to fit on one screen. The current leg is initially shown at the top of the LOG, so long as pilot has not made any scroll. If the pilot does scroll, he will have to reset back the highlight to the desired leg because this is not automatically carried out.

Note that if any SID, STAR or APP has been activated, all corresponding waypoints are displayed in the log.

The pilots can optimize the flight conditions by using the lower part of the page. The pilot chooses ISA DEV (initialized to the planned value on the leg which is displayed in the LOG); Mach number by using the LRC or MCRU soft key, or by inserting a value manually; and flight level with OPT or MAX or CRT soft keys, or by inserting a value manually.

As soon as Mach number and FL are chosen, the corresponding flight parameters (mach, FL, TAS, Nm/Lb.) are displayed based on the present weight, and are permanently updated even if NAV LOG page is deselected and reselected later. Then, a "N LOG" key appears which allows crew to accept the computed values and transfer the data to the FMS. In addition, an optimization for the following legs is carried out, according to the chosen criteria. During computation, relevant parameters are erased. They are re-displayed cyan at the end of computation. The "CLEAR" and "ACTIVATE" keys are displayed so as to allow return to previous status or confirm computed values.

Second Column

The second column of menu 122 allows access to engine and mechanical systems pages, clicking on ENG/CONF; FUEL/ENV; HYDRAULICS; ELECTRIC:

NAV DATA

Figure 12:
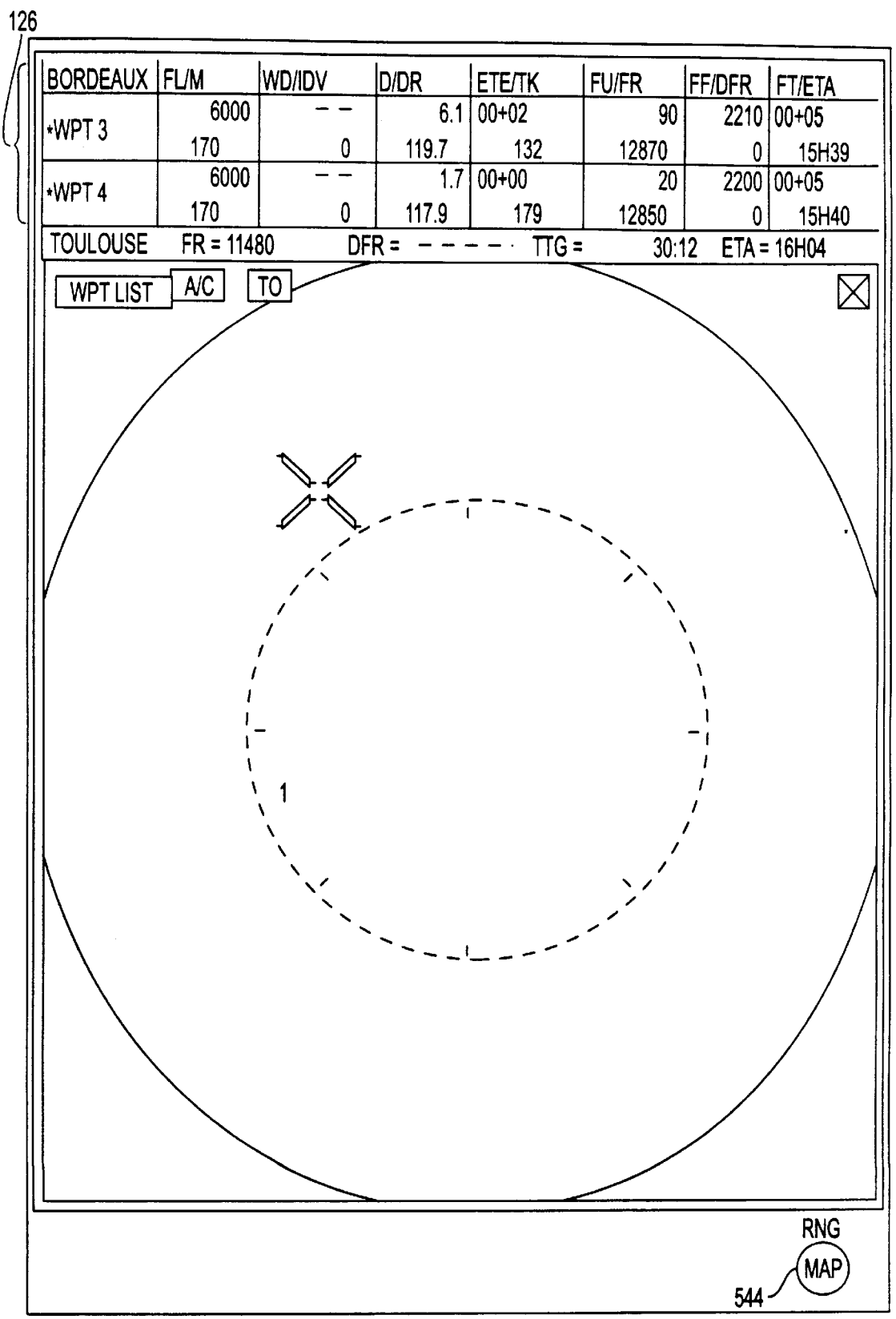
FIG. 12 is a drawing of the NAVDATA window of the MFD.

The NAV DATA window (FIG. 12) consists of an extract of NAV LOG providing only a few lines of TO/NEXT legs 126, and provides the amount of fuel remaining, the difference with fuel predicted in mission preparation, and TTG and ETA on DEST. No modification can be carried out on this page.

SENSORS

Figure 24:
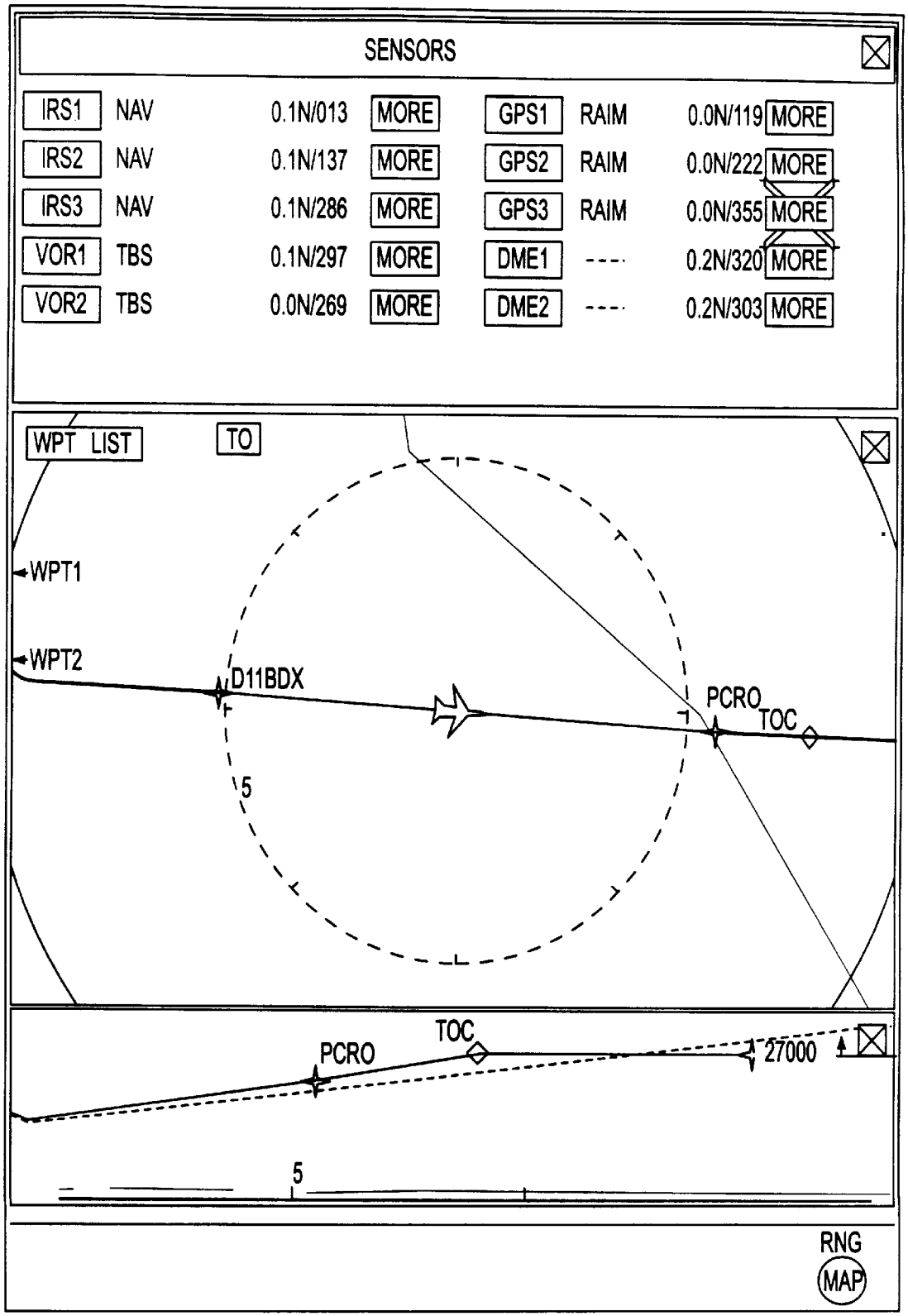
FIG. 24 is a drawing of the MFD displaying a "sensor" page.

This page (FIG. 24) displays navigation sensors modes and current status, 128 with their estimated localization error, given in bearing and range from FMS reference position. It includes two series of four columns. For each series, the columns include:

First Column

Selecting keys for each sensor, with name of sensor. They are not displayed if the sensor has failed. They are white framed if not selected, green framed green if selected.

Second Column: Status or Mode Indications

IRS: NAV, ALIGN, SBY or FAIL

GPS: RAIM, 4 SAT, ACQ or FAIL

To discover an anomalous condition of a satellite, the RAIM concept provides use of redundant satellite data to generate reliable position information even if one received satellite signal is incorrect. It requires at least 5 satellites to be tracked simultaneously with good geometry. Six satellites simultaneously tracked can isolate the anomalous satellite. The RAIM status indicated in the sensors page is related to a 5 satellites status (without also utilizing a signal from the barometic altimeter) that is planned to be kept at least for five minutes.

4 SAT is displayed while acquiring GPS constellation or while not able to track at least five satellites.

ACQ is displayed while acquiring GPS constellation or while unable to track at least four satellites.

VOR: NAME OF STATION, FAIL

DME: NAME OF STATION, FAIL

Dashes are displayed when NCD, and these labels have the same color as sensor's name.

Third Column

Localization error given in bearing and range from FMS reference position.

Fourth Column

For each sensor, a "MORE" soft key allows pilot to get more information by calling up an additional page which displays:

Name of sensor sensor status position localization in geographic coordinates value of ground speed supplied by this sensor and estimated drift of the sensor Third Column (Main Menu, FIG. 9)

This column of MAIN MENU entries includes sensor information related to the horizontal situation.

WEATHER

This entry allows selection of weather radar image for display on the MFD. It is superimposed on the current horizontal situation indicator, in whatever the format (track or north oriented) the latter might be. Radar is managed using the MFCU to select the desired elevation and mode.

TCAS

The traffic alert and collision avoidance system (TCAS) provides location of traffic approaching the aircraft too closely and displays corresponding symbols on PFD and MFD, with digital indication of their level and their vertical velocity (only up or down and only if greater than 500 ft/mn ). These symbols can be displayed in any one of the charts of horizontal and vertical situation. In addition, a "full TCAS" symbology can be displayed in the PFD, by pressing the TCAS push-button of PFD or automatically in case a serious threat occurs.

GCAS

GCAS (Ground Collision Avoidance System) is actually a software function and not a sensor. It does not use any radar functionality such as ground mapping. Instead, it derives the potential ground collisions that could occur from the built-in terrain database and from the knowledge of the accurate aircraft position. To achieve this, the system compares future possible paths with the elevation of ground that could be overflown. It provides the profile of terrain that is planned to be overflown (up to 2 minutes) in the vertical situation page and highlights dangerous areas on the horizontal situation chart, according to the following rules:

Amber points: terrain which is less than 100 meters below the current path, assuming that slope will remain unchanged.

Flashing red points: terrain that aircraft can still avoid with a vertical margin of 100 meters at least, if pilots performs a full-power pull up at 1.3 G followed by a 10° climb. This pull up must begin (at the latest) between 3 and 15 seconds after the warning is received.

Continuous red sectors: terrain that can no longer be avoided by performing a pull up, avoidance must be achieved by changing course laterally.

The two first formats (amber and flashing red points) can be superimposed on the rest of the symbology, including weather-radar image. The third one has priority over others.

GCAS is inhibited when aircraft is within a range of 2 NM to destination airport. A red warning will be displayed on PFD (and in HUD) if a red area appears in the ±45° azimuth sector in front of the aircraft.

LSS

The lightning sensor system LSS of the weather radar provides location of detected lightning areas. For each one, a small red symbol will be displayed in the horizontal situation indicator.

W/CNTR

This weather and control area window provides the crew with the location of both the weather forecast and the control areas symbols on the MFD. With the former, pilots can get access to a window giving the name and frequencies of VOLMET stations. (These are indicated by a circled "W" symbol, colored purple). The latter provides them with control areas on the different charts likely to be displayed on the MFD. These are indicated by a circled "C" symbol, colored purple. Clicking on it displays the corresponding window that gives the name of the station, used frequencies and any relevant information.

GEO

This entry is actually a soft key that controls display/ erasure of geographical information on the chart currently displayed on the MFD. This information consists of sea- ocean, lakes and main rivers. These geographical elements are colored dark blue. Earth regions are uncolored and hence shores clearly appear at the limit of earth/water.

AIRPORTS

This soft key controls display/erasure of airports symbols on the currently displayed chart.

AIRWAYS

This soft key controls display/erasure of airways symbols on the currently displayed chart.

Fourth Column

This column of Main Menu entries provides display of maps and charts (occupying ⅚ of the screen) with vertical profile (occupying ¼ of the screen, that can be automatically compressed to ⅙) usually provided by Jeppesen publications, with the current location of the aircraft represented by an aircraft symbol similar to the symbol on the PFD. For all these charts, the bearings and radials are with respect to magnetic or true north, according to the MAG/ TRU selection; enroute distances are in nautical miles; vertical measurements of elevation are in feet above mean sea level; enroute altitudes are either in feet above mean sea level or clearly expressed as flight levels. All times are UTC unless labeled local time. These charts can be displayed in two different formats, map and plan (also known respectively as "heading up" and "north up"), and are centered on aircraft position. This rule is always true in "heading up" format, and in "north up" format without an active flight plan. While in "north up" format with flight plan, the chart is centered on a "TO" waypoint.

In map format (heading or track oriented), a heading rose provides a cyan bug (steering course) and the corresponding cyan line that joins aircraft symbol and bug. It also includes a circle located at half-range, with the digital value of the corresponding range-scale. Both circle and rose are centered on the aircraft symbol.

In plan format (north oriented), two circles centered on a reference point (default point is the "TO" waypoint) are displayed. Therefore, while using certain range-scales, aircraft symbol can be hidden. The central circle includes range-scale value and right-left 45° tick marks.

For these two formats, a magenta line showing the predictive path up to one minute in the future, computed from present speed and bank angle, will be displayed in front of the aircraft symbol.

As shown in FIGS. 13–16, MFD 18,20 can display an Airport map, a SID chart, an enroute low altitude chart, and an enroute high altitude chart. Other displayable charts include STAR and approach charts. Each of these charts can be displayed with a vertical profile. For both map and plan formats, a magenta predictive path is displayed in front of the aircraft symbol, indicating the expected path up to one minute in the future, computed from present speed and bank angle. Computer 63 responds to operation of trackball 44 to highlight a waypoint indication when the cursor coincides with the waypoint indication on the vertical profile and simultaneously highlights the corresponding indication of the waypoint on the horizontal situation display.

Figure 13:
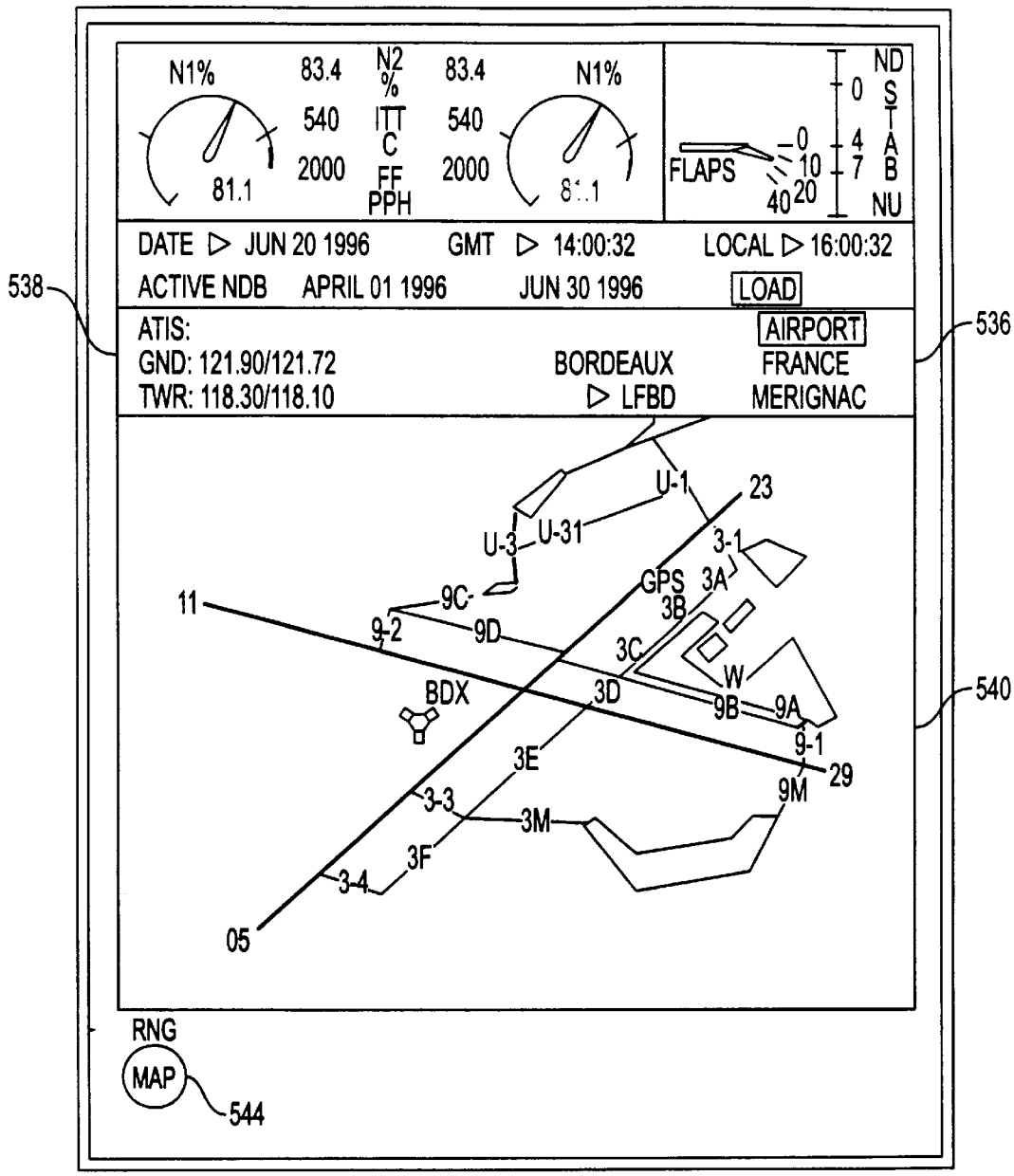
FIG. 13 is a drawing of the MFD displaying an airport map.

FIG. 13 shows an available airport map, similar to the standard Jeppesen airport diagram. It includes a window 536 with the name of the airport, and country and name of the closest city; a window 538 with radio frequencies, including ATIS, clearance delivery, ground, tower and departure frequencies; and an airport map 540 containing ground facilities, terminals, control tower, runways, taxiways, aprons and stands, elevation of particular points on and around the airfield. Additional information related to any particular point, like a runway or parking stand of the airport, can be displayed by designating the point with the cursor. The information will be displayed in a special window in place of the cursor. This page is automatically displayed on MFD 18,20 in a 1 NM range-scale, north-oriented, at initialization as shown in FIG. 10.

Figure 14:
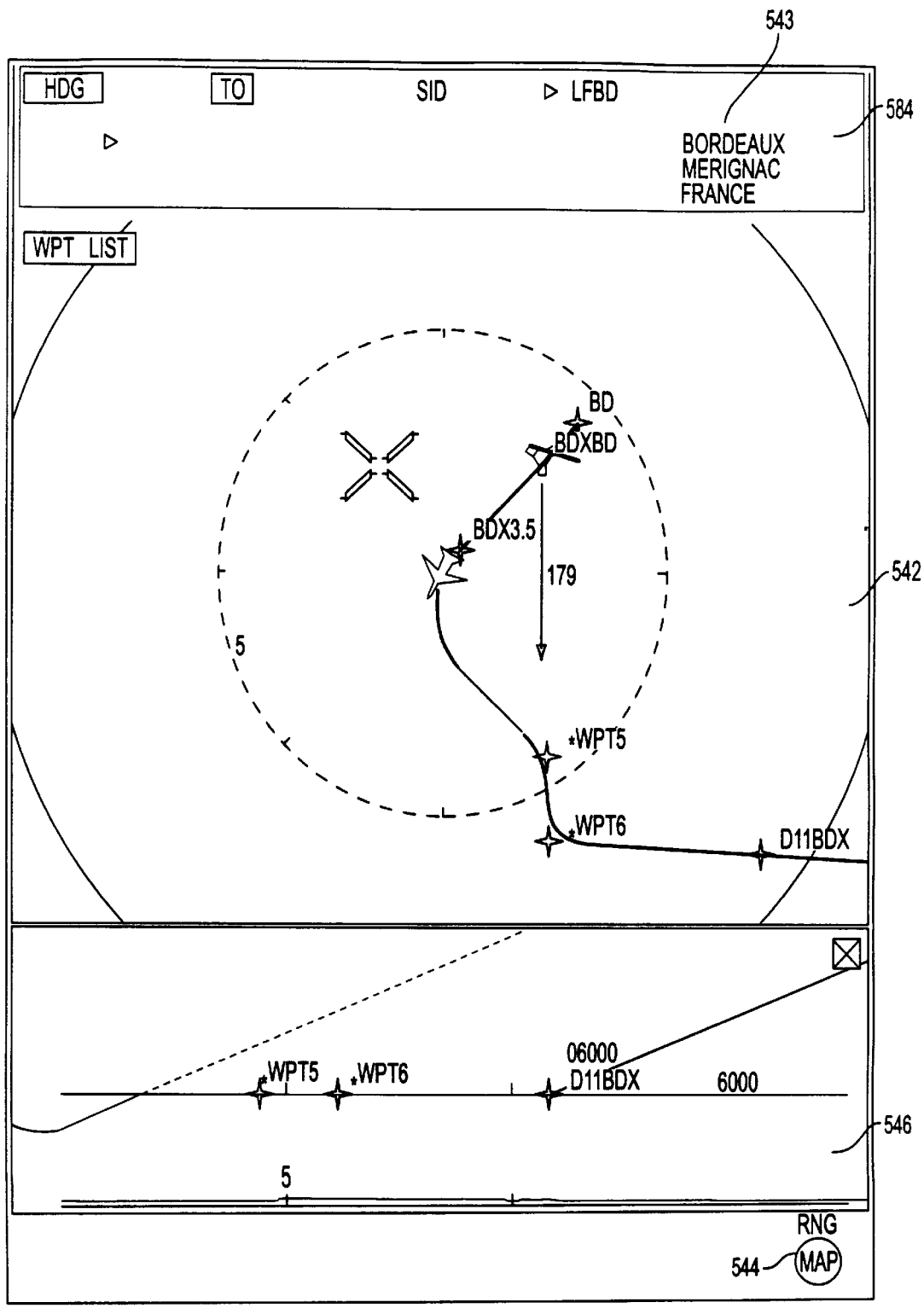
FIG. 14 is a drawing of the MFD displaying an SID chart.

The standard instrument departure (SID) chart is shown in FIG. 14. This chart displays the standard instrument departure data for the selected SID procedure. It includes a window 584 containing name of procedure and name of the corresponding airport; and a window 542 containing the chart that displays runways, radio navigation aids related to the procedure, radials defining the SID path, FMS waypoints and planned path. The default range-scale for this chart is 5 NM, centered on the departure airport. No accurate vertical profiles are published in traditional SIDs. Instead, vertical information is generally limited to mandatory altitudes over particular points. In the present invention, however, altitude information is obtained from the terrain database, and is used by the FMS computer 63 to supply the vertical profile that can be displayed in the vertical profile window 546.

Enroute low altitude charts can also be displayed on MFD 18,20. These navigation charts are for routes located up to flight level 190 (FL 190). They include airways, waypoints, report points, R-NAV aids, airports (without any name) and limits of control and forecasting areas. For all these symbols, a window can provide additional information. This content varies according to the selected range-scale. Moreover, selected portions of the map database can be simultaneously displayed as a visible map display with portions of the aeronautical information database as navigation aid indicators such that the geographic locations of navigation aid indicators are correlated on the display device with the corresponding geographic locations of the map display. Portions of the display device can then be designated as a control active region, such that computer 63 responds to operation of the cursor control device and selection device to highlight navigation aid indicators at the current cursor location and to retrieve and display database parameters of the highlighted navigation aid indicators from the aeronautical information database.

Figure 15:
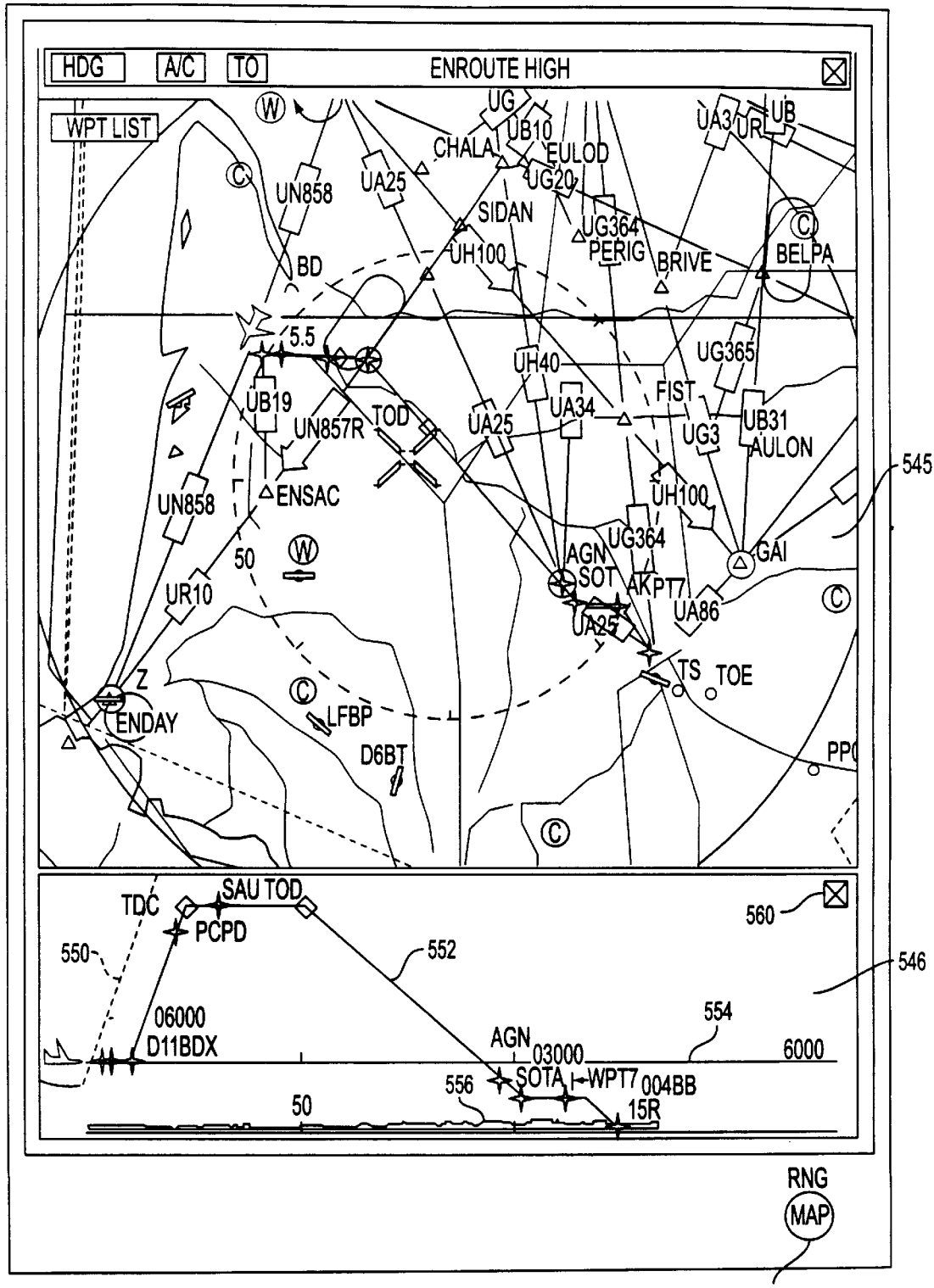
FIG. 15 is a drawing of the MFD displaying an enroute high-altitude chart.

Enroute high altitude charts, shown on MFD 18,20 of FIG. 15, can be displayed, and provide the same information as low altitude enroute charts, for routes located above FL 190. FIG. 15 shows an enroute high altitude chart 545 and a vertical profile 546 for the route selected.

Another displayable chart is the "STAR" chart. This chart provides the standard terminal arrival route which has been selected in the FLIGHT PLAN page, to be described below. It includes required path, corresponding waypoints and references such as radials of other waypoints when those radials define the path.

Finally, approach charts can be displayed on MFD 18,20. These charts provide approach procedures which are chosen in the ARRIVAL page, to be described below. The charts include all the information usually provided in the paper Jeppesen approach charts. The approach can belong to one of the following categories: VOR, VOR/DME, LOC, ILS, ILS/LOC, ILS/DME, MLS, NDB, NDB/VOR, RADAR, GPS, D-GPS, or VFR. The VFR approach, though it is usually not published in IFR documentation, is often carried out when VMC (visual meteorological conditions) exist. It consists of two phases. First, from the end of enroute flight plan or STAR, the aircraft rejoins a point located on runway axis at 4.55 NM from runway threshold and 1500 ft above ground. This point is known as VFR FAF (final approach fix). Secondly, the aircraft rejoins a point located at 50 ft above runway threshold, with a slope of 3° (5%) with DTK=RTH. The autopilot can follow this procedure in LNAV and VNAV modes. Radius of alignment turn will be computed for a ground speed value of 150 Kts. The corresponding go around (G/A) procedure consists of a climb on the runway axis up to pilot's intervention. Note that it is possible to cross ASEL (altitude selection on the autopilot); in descent after passing VFR FAF, without any audio alarm, just like for other approaches. ASEL remains displayed in cyan when passing VFR FAF.

A vertical profile can be displayed on MFD 18,20 using the "VER PROF" label in the main menu 122 (FIG. 9), but under the condition that at least ⅓ of screen size remains available to show the horizontal situation. The vertical profile is located at the bottom of the MFD, in a ¼ screen size format that can be reduced to ⅙ screen. As displayed in window 546 of FIG. 15, the vertical profile includes:

Aircraft symbol, always at the extreme left, with 5 seconds in a continuous line, plus an extrapolated path of up to 30 seconds shown as a magenta discontinuous line 550.

Current vertical flight plan 522 if VNAV mode is selected or can be selected on AP. A vertical flight plan must be filed and the aircraft must not be too far from horizontal flight plan (in distance and track). Note that the path displayed herein is only made of lines without any circle-arcs. Names of waypoints, altitude and slope constraints are always displayed.

Current slope.

AP slope when in basic mode on vertical plane.

ASEL, indicated by a cyan horizontal line 554 and the corresponding digital value, or a cyan arrow giving its direction (up only) if it is out of field.

Marks corresponding to 0.5 and 1 times the range scale of MFD.

Profile of terrain 556 which is likely to be overflown, if GCAS is selected, up to 2 minutes in the future, extrapolated from present flight parameters.

The vertical range-scale is automatically set, while the horizontal range-scale depends on the range of the currently displayed horizontal situation. The former is automatically computed so as to display zero altitude at the bottom of the profile and the highest of the following points at the top of the profile: Aircraft symbol; Highest part of displayed portion of current vertical flight plan; ASEL (if vertical flight plan is not displayed); 2000 ft altitude. (To avoid a too large a scale when aircraft is close to the ground.)

In the vertical profile, the cursor can capture waypoints and altitude constraint readouts.

Several controls are available for charts management. These include range-zoom rotary knobs 544 on MFD 18,20 and an off center push-button 48 located on track-balls 44, 46 (FIG. 1). The range-zoom rotary knob includes two knobs. With the outer one, the pilot can adjust the range-scale up to 4000 NM. 600, 1000, 2000 and 4000 NM range scales are also available. The inner knob allows adjustment of zoom. The range-zoom rotary knob is also fitted with a push-button. Pressing it causes the currently displayed chart to toggle between map and plan options. The plan (heading up) option is available only if the currently displayed chart is the "system chart" (i.e., the chart of the current flight phase) or "enroute chart".

When the range-zoom scale is toggled, current range-scale is kept and the chart is centered on the aircraft. Thus, a double pressing performed on this knob while in map (north up) setting of the system or enroute charts centers the format back on the aircraft without any range-scale or chart change.

For each of the charts, range/zoom controls can specify a desired discrete map scale for display on the display device. Moreover, the data items of the map and aeronautical information databases are each classified as one of a plurality of priority levels each corresponding to a different map scale. The flight computer responds to operation of range-zoom rotary knob 544 to display the map and aeronautical information databases at the desired scale and perform a de-clutter function to display only those data items corresponding to the desired scale. In contrast, computer 63 responds to the operation of the inner knob 544 to provide a continuously variable range scale adjustment without de-clutter, thus continuing to display all data items that were displayed prior to the zoom operation.

Also available for each chart, except the system chart, is a fast-deselecting soft-key. It consists of a little white square 560 with a white cross inside. This key is situated at the top right of the chart and enables the pilot to erase the chart by clicking on it. Each time a chart is deselected this way, the system chart will replace it. In addition to the deselect key, some charts are fitted with a key that enables the pilot to directly go back to the previous chart. This kind of key is always located at the top right of the chart and it contains the name of the chart to which it provides access.

Direct access keys to other charts or pages are also available for some MFD display pages. These keys have no fixed location, but rather are situated at the location where they might be needed. The label of these keys is not necessarily the name of the chart that it calls up, but has been chosen so as to mean something very specific in the pilot's mind. The pages having this feature are: the FLT PLN page, the ARRIVAL page, the SENSOR page, the INIT page, and the FPL LIST page. The charts can be manually centered with off center button 48 on track-balls 44, 46. This button centers the chart on the current position of cursor.

If the selected chart is the "system chart", that is, the chart covering the current flight phase, the format (north or heading up) and centering remain identical to the value they had at the last call-up (or default values if it is the first selecting). When the pilot requests a chart that is not the system chart, it will always be displayed in "north up" format. When an airport chart is manually called up, it is displayed north-up oriented with a range-scale such that it encompasses the whole airport. If destination airport exists, this chart consists of the destination airport chart, if not, the closest airport chart shall be displayed.

When a SID, STAR, or APPROACH chart is manually called up (assuming that the corresponding procedure is defined and activated), the chart is displayed north oriented with a range scale and centering such that the format encompasses the whole procedure. If no procedure has been activated, only the upper window of the chart, including the name of the airport is displayed. This name consists either of the destination airport if known, or of the closest airport if not. A pilot can display the chart of any SID, STAR, or approach different from the activated one (but still corresponding to the same airport) by replacing the procedure name 544 (FIG. 14) with the name of the desired new procedure. If a chart of a procedure of another airport is desired, the same actions are performed but the name of corresponding airport must also be entered. In this latter case, the path of the procedure will be displayed magenta in both the PFD and MFD.

When enroute charts are manually called up (assuming that the corresponding flight plan is defined and activated), they are displayed north-oriented with a range scale and centering such that the format encompasses the whole flight plan. In case no flight plan should be defined, the chart is displayed in a 50 NM range-scale, north-oriented and aircraft-centered.

All the charts provide the capability to select displayed frequencies. Clicking one of the frequencies in the map displays the TUNE 1 and TUNE 2 soft keys. Clicking on one of these keys, e.g., TUNE 1, assigns the selected frequency to the chosen radio unit, e.g. COM 1.

Several miscellaneous windows are available for use with the MFD charts. To display these windows, pilot selects the particular point of interest with the cursor. The corresponding window appears at the place of cursor. Its size depends on the number of parameters related to the point of interest. Some of these windows includes labels that allows access to sub-windows. The pilot can click on them to cause sub-windows to appear. The following list gives all the special points which allow access to additional information windows.

All types of waypoints (Published waypoints of any chart, FMS waypoints (i.e. TOD & TOC), pilot-built waypoints, radio reporting points.); RNAV aids (VOR, DME, ADF, NDB, TACAN, LOC, markers, D-GPS.); runways (when ILS-fitted, both runway and ILS information will be merged in a single window, allowing access two different sub-windows.); airport reference points; control towers; stands; taxiways; parking & aprons; airways; holding patterns; control areas; forecasting areas; airports; waypoints of current navigation; legs of current navigation or airways; aircraft; TOC/TOD.

Note that the only symbols that can be consulted on a vertical profile are waypoints, and in this particular case just the slope constraint will be displayed.

The information provided for the various points is as follows:

NAV AID: Provided information consists of: Name of station, Category (VOR, DME . . . ), Class (high altitude, low altitude, terminal, unrestricted) or ILS category (I, II, III, IIIA), Frequency, Corresponding Morse code, Coordinates (L,G). In addition, if the point consists of a VOR or an ADF, two soft keys "TUNE 1" and "TUNE 2" allow pilot to tune radios and hence to get the bearing to this station.

AIRPORT: Consultation of any airport symbol displays a window with a single key that allows access to the corresponding Jeppesen chart and aids for approach (ILS . . . ). Cursor is automatically displayed on a "RETURN" soft key so as to allow pilot to return to the navigation chart. Thus, it is possible to consult any of the airport's charts, under the condition that its symbol is displayed on the screen. Note that airport charts can be directly accessed from "AIRPORT MAP" soft key in the main menu.

RUNWAY: If the designated point is a runway threshold, the window gives the following information: Runway true heading, with an accuracy of 0.1 degrees; Magnetic heading; Threshold elevation; Runway mean slope (average slope between both thresholds); runway length.

WAYPOINT: (Flight plan waypoints) displayed information is: Name of point; Nature of point (NAVAID, AIRPORT, . . . ); range; estimated altitude; estimated fuel on this point; E.T.A; Time constraint; track constraint; Altitude constraint (AT, ABOVE, BELOW); Speed constraint; Slope constraint; Flyover constraint and/or HOLD (holding pattern); Offset.

LEGS: (Flight plan's legs or airway outside flight plan) displayed information is: Name of airway; true track; Length; MSA (minimum safety altitude).

AIRCRAFT: designation of aircraft takes a snapshot of present L/G coordinates and displays them in a window. This one also includes useful parameters so as to define an immediate holding pattern, with an "ACTIVATE" (or "DELETE") key, just like for a waypoint.

TOC/TOD: displayed information is: Range to this point; TTG to this point;

WEATHER: It is always displayed on the screen. It provides access to VOLMET frequencies with capability to automatically tune MFCU on them ("TUNE 1" and "TUNE 2" softkeys).

MEANINGLESS AREA: Any designation outside one of these special points displays a window with latitude/longitude position of designated point.

If one point has several functions (e.g. NAVAID located on an airport that belongs to flight plan), the system automatically proposes a menu to let pilot choose the category of information he wishes.

Figure 16:
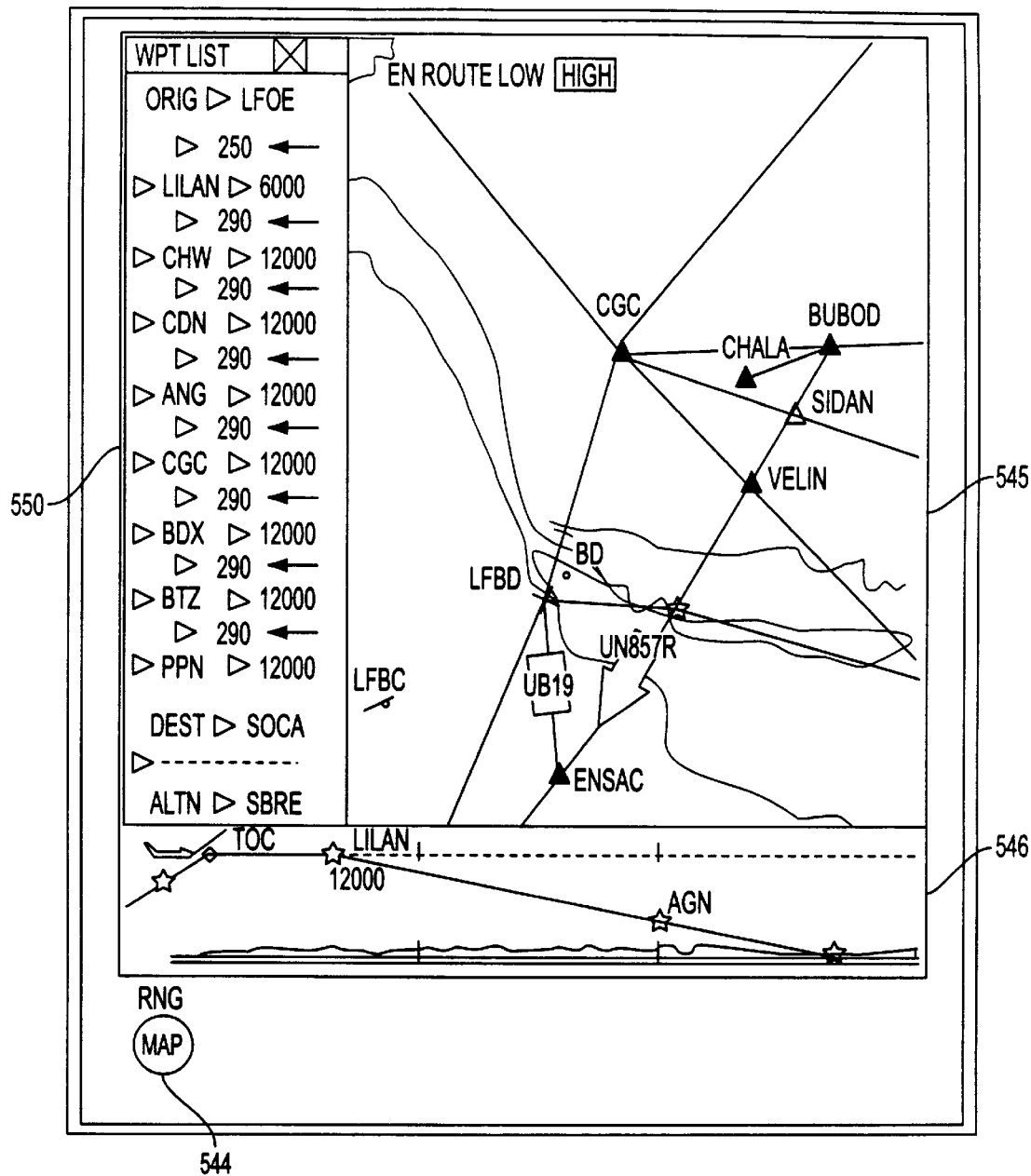
FIG. 16 is a drawing of the MFD displaying enroute high-altitude chart with a waypoint list.

Windows related to parking stands on an airport apron include special instructions for parking and all the information related to clearance deliveries, alignment, start up, push-back, tow-out, parking Waypoints List When a flight plan has been built, a <<WPT LIST>> soft-key is available at the top left of each chart, as shown in FIG. 16, to let the pilot display the list of waypoints that define the flight plan, just beside the chart. Each waypoint is displayed with its name, desired altitude and speed. Referring to FIG. 16, the list 550 is displayed on the left side of the chart 545, without covering the vertical profile 546, if displayed. As long as the flight goes on, this list is updated so as to always display the <<FROM>> waypoint at the top, followed by the <<TO>> waypoint and the following waypoints. In case this list becomes too long, two <<scroll>> keys will be displayed at the bottom right of the list.

Throughout this list, crew can also call up and use the window related to each waypoint, by clicking on the name of the waypoint in the list, even if this waypoint is not currently displayed on the chart. In addition, all usual actions that are available for the manual flight plan chart remain available for the waypoint list. It includes modification of desired speed and altitudes, addition of a waypoint in the list, removal or change of a waypoint.

Check-List

The check list management system provides access to the multitude of status and operational procedures that must be managed to provide safe and efficient operation of the aircraft. The check lists are grouped by function into "chapters", "pages" within each chapter, and "instructions" within each page, and are stored in memory of MAU 65d. The chapters include: normal, abnormal, user, and emergency. The normal chapter is semi-automatic, it is displayed on pilot's request by switch 38 but provides direct access to check lists pertinent to the current flight phase. The abnormal chapter is displayed on request but with direct access to the relevant page in case of a failure. The user chapter is on request only. The emergency chapter is automatically displayed when any failure occurs, but the pilot can also access it while in normal operations.

The entire check list system is managed solely by using the special check list button switch 38 located on pedestal 14. The switch is a two-axis rocker switch with orthogonal axes. Each axis has a pair of momentary contact side positions and a center return position. Switch 38 can thus be moved between four positions to access the check list function. The four positions of the switch are labeled UP/RCL, RTN, ON/ENTER, and DOWN/SKIP. Operation of the switch positions cause computer 63 in MAU 65a to execute different functions depending on where in the check list menu it is activated.

When the check list has not yet been requested, movement of switch 38 to the UP/RCL position calls back the last displayed page. Movement of switch 38 to the ON/ENTER position displays a "chapter" menu on MFD 18,20 which has the labels normal, abnormal, user, and emergency. A red cursor is automatically positioned on the abnormal label if any current amber failure has not been reset, and on normal otherwise.

ON/ENTER operation while the chapter menu is displayed causes display of a page menu for that chapter. If the aircraft experiences an abnormal condition, such as an electrical generator failure, the system responds by illuminating the master caution lights 62. When a pilot presses one of the lights 62 to reset it, the lights are extinguished and the generator failure check list page appears on the screen of MFDs 18,20, specifying the procedure to be followed to maintain maximum safety. There are two types of items on the check list: items that are automatically changed by computer 63 from white to green when the appropriate action has been performed by a pilot, and items for which the pilot must manually acknowledge. In the example set forth above, after the generator automatically is taken off-line by maintenance functions, an item in the check list might be to connect the bus to a second generator. When the pilot performs this step by appropriate operation of breakers on the electrical control panel, computer 63 senses the completion of the step and automatically changes the color of the corresponding check list item to green, constituting an acknowledgment of the completion of the specified step in the check list. Another item in the check list might be to shut down all unnecessary electrical loads. Execution of this step is not automatically detected by computer 63. Therefore, the pilot must position the cursor on the check list the specified item using switch 38 and then acknowledge the item by operating switch to the ON/ENTER position. This operation causes the corresponding check list item to turn green.

When no abnormal conditions pending and the ON/ENTER is pressed while a chapter menu is displayed, the current flight phase check list page is displayed. When the page menu is displayed, ON/ENTER calls up the chosen instruction page with the cursor at the place of the first non-acknowledged instruction. UP/RCL and DOWN/SKIP respectively make the cursor move up and down. RTN recalls the chapters menu with cursor on the same chapter.

When an instruction page is displayed, ON/ENTER operation serves to acknowledge the instruction and set the cursor one step forward. Continued such action eventually causes the next page to appear. UP/RCL returns the cursor to the first skipped instruction. DOWN/SKIP skips one instruction without carrying out the instruction, which causes the page to scroll. RTN recalls the pages menu with cursor on the same page.

Computer 63 responds solely to operation of check list switch 38 to control display of check list information on MFD 18,20. The pilot thus can achieve complete management of the check list function by operation of a single switch.

Multi Function Control Unit

Figure 17:
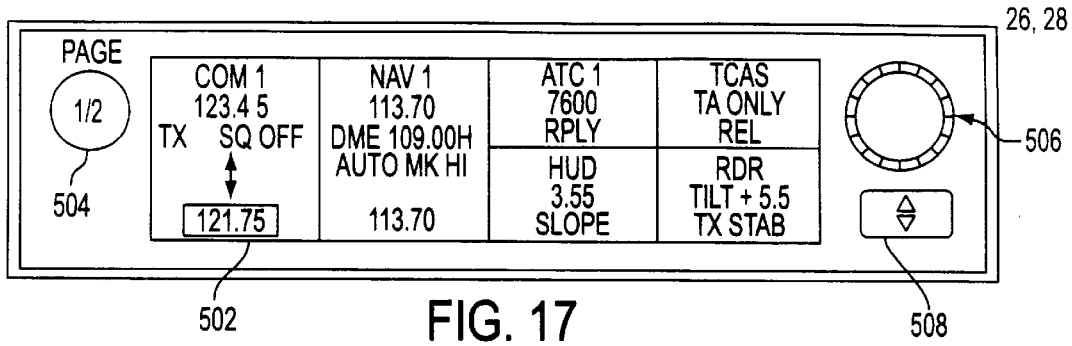
FIG. 17 is a drawing of the Multifunction Control Unit of the flight deck of FIG. 1, (MFCU) displaying the first menu page in the captain's station.

Referring to FIG. 17, Multi Function Control Units (MFCU) 26, 28 are designed to manage NAV and COM radios, weather radar, GCAS, D-GPS, HUD, SATCOM and DATALINK. One unit is located above each MFD 18,20, and includes a screen 502 which may be touch-sensitive. Screen 502 is divided into eight parts. A push button 504 labeled PAGE 1/2 on the left side, provides access to a second menu page, shown in FIG. 18. A double rotary knob 506, on the right side, selects frequencies or modes. It can be pressed to send an identification code (IDENT) to air traffic control. A swapping button 508 provides the capability to permit either MFCU 26 or 28 to control all functions.

Two different types of pages are defined for the MFCU: There are two menu pages and twelve special sub-pages, each corresponding to one device managed by MFCU 26, 28. Managed devices are COM 1/2, NAV 1/2, ATC 1/2, HUD, TCAS, RDR, HF 1/2, ADF 1/2, GCAS, SATCOM, DATALINK, COM 3.

Figure 18:
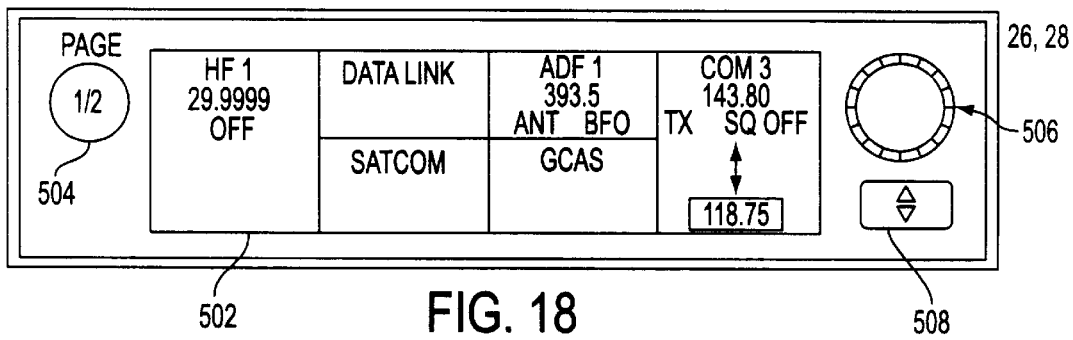
FIG. 18 is a drawing of the MFCU displaying the second menu page in the captain's station.

The two menu pages display different areas, each devoted to one of the devices managed by the MFCU. FIGS. 17 and 18 show the captain's first and second menu pages, respectively, which are selected by pressing "PAGE 1/2" button 504. Pressing once one of the eight displayed options on touch sensitive screen 502 selects the desired function, which becomes cyan framed to indicate that any action performed with rotary knob 506 will modify this option. Pressing again on the option inside the cyan framing calls up the corresponding special page of the MFCU 26, 28.

The difference between the captain's and the first officer's display MFCU 26 and 28 lies in the different devices managed. The captain manages COM 1, NAV 1, ADF 1 and HF1, whereas the first officer manages COM 2, NAV 2, ADF 2 and HF2. All other devices are common.

Figure 19A:
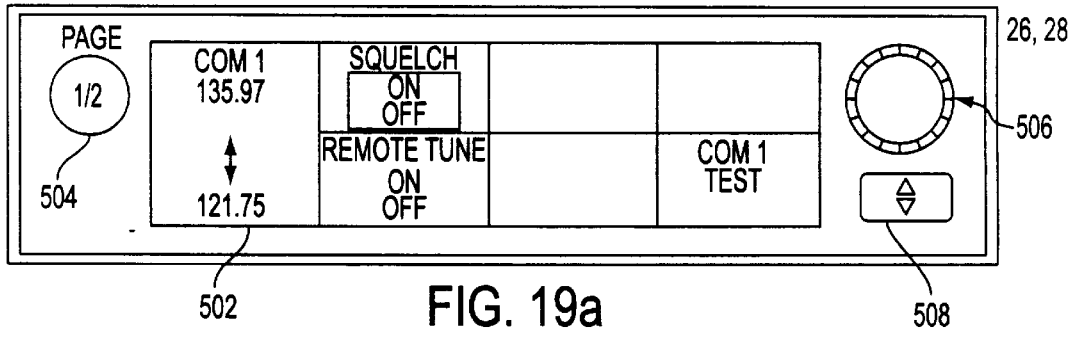
FIGS. 19 (a–g) are drawings of the MFCU displaying the sub pages in the captain's station.
Figure 19B:
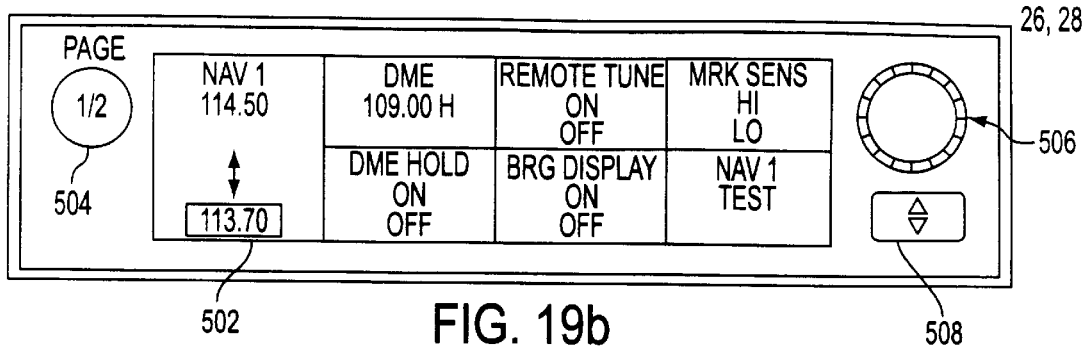
Figure 19C:
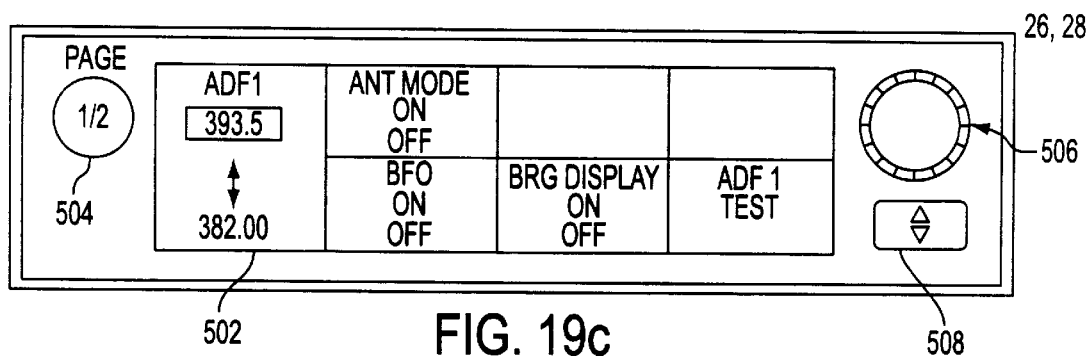
Figure 19D:
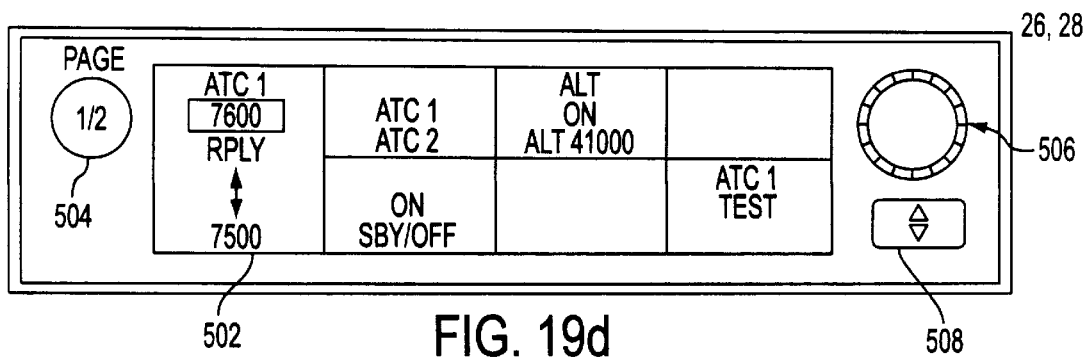
Figure 19E:
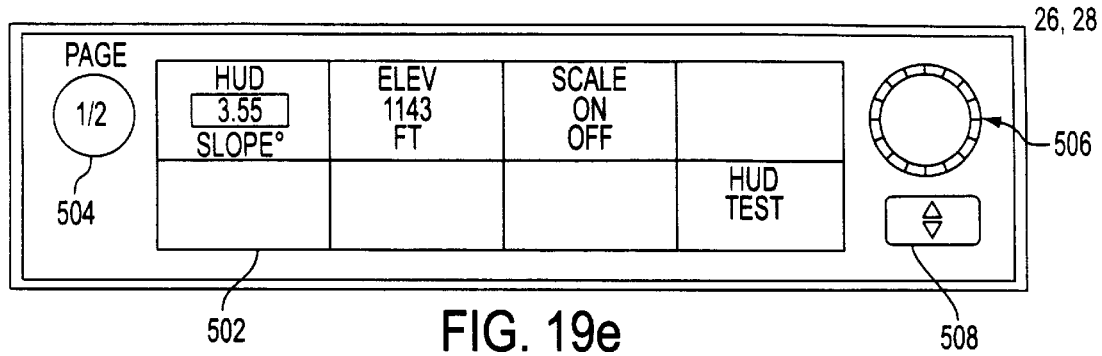
Figure 19F:
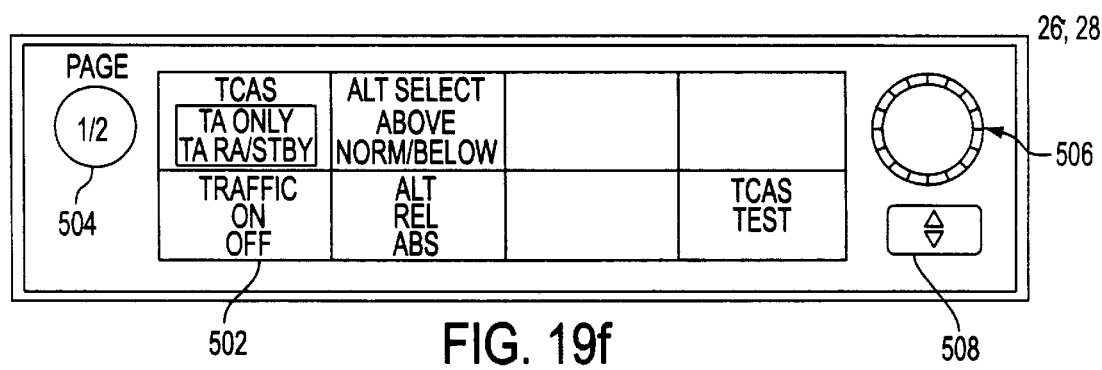
Figure 19G:
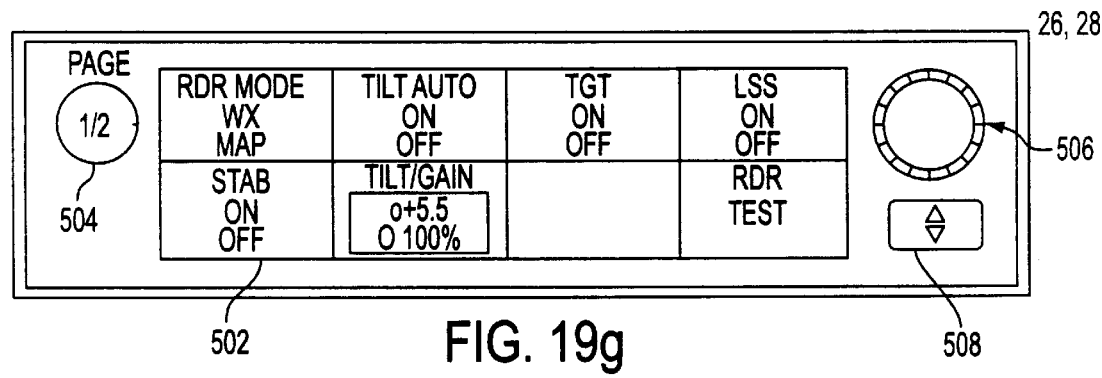

Some of the sub pages accessible through the MFCU are the COM (FIG. 19(a)), NAV (FIG. 19(b)), ADF (FIG. 19(c)), ATC (FIG. 19(d)), and HUD (FIG. 19(e)) sub pages. These are used to control communication radios, navigation radios, automatic direction finder, aircraft transponder, and head up display respectively. Additionally, TCAS and radar displays can be controlled through MFCU sub pages, shown in FIGS. 19(f) and 16(g).

Autopilot and Autothrottle Display and Control

Figure 20:
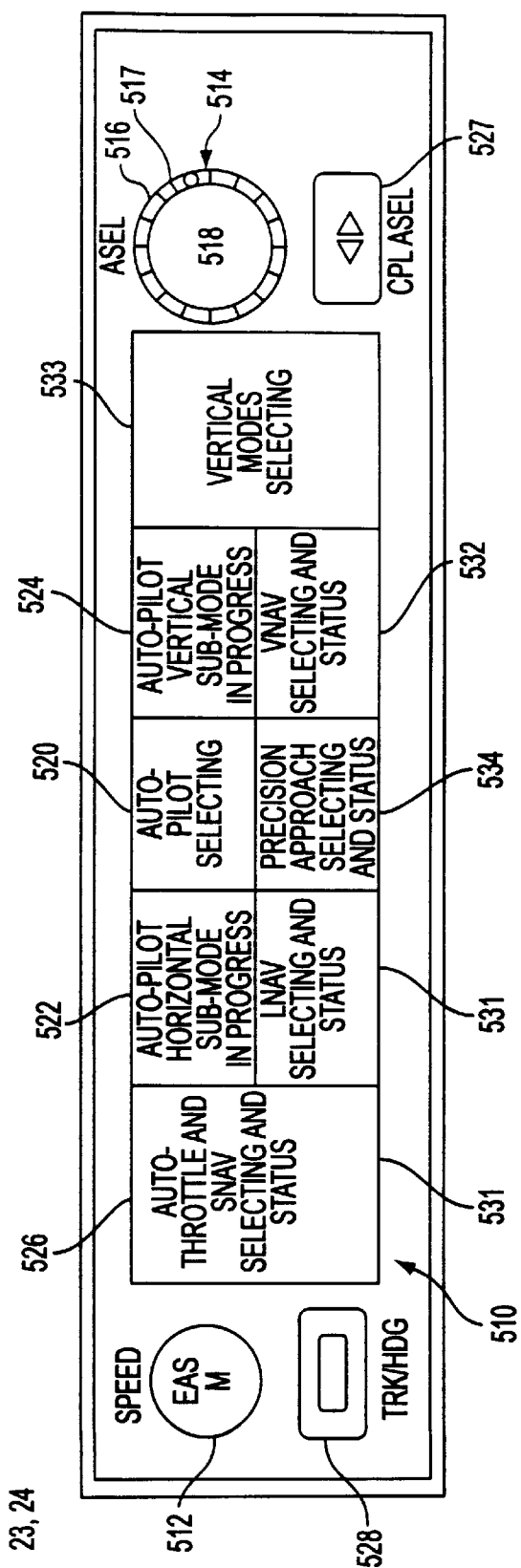
FIG. 20 is a drawing of the Autopilot/Autothrottle controller of the flight deck of FIG. 1, displaying all the soft keys.

Referring to FIG. 1, Autopilot/Autothrottle controllers 23, 24 are located above each PFD screen 14, 20. FIG. 20 shows a preferred form of the AP/AT controller 23, 24.

The autopilot provides control of the aircraft using a variety of modes. Except for the basic climb/descent modes, all modes provided by the autopilot (AP) are improvements of the functions of previously existing autopilot systems. Several modes, such as vertical speed, pitch, FLC, VOR, VFLC and back course have been deleted, because their mode of usual operation causes potential confusion with other modes, and because their corresponding functions can be better performed in other ways. Given the fact that one of the basic purposes of the present cockpit design is to simplify avionics operation, one goal of the design is to reduce the number of modes and the complexity of the autopilot. This results in a safety improvement.

Selection of modes and status display are combined in two identical and synchronized controllers 23, 24. These controllers are fitted with screens 510 which may be touch-sensitive and use color and reverse video to provide information on the status of both AP (autopilot) and AT (autothrottle) so that the crew cannot miss important information. All AP components are common for both the captain and the first officer.

The controller is fitted with two rotary knobs. A left knob 512 controls the value of desired speed for the AT, and a right knob 514 controls the value of altitude selected (ASEL). Right knob 514 is made of two concentric knobs 516, 517 plus one "ALT" push-button 518. With outer knob 516, the pilot can adjust the ASEL in multiples of 1000 ft, with inner knob 517 the increment is 100 ft. Pressing the "ALT" push-button 518 selects current altitude holding.

The screen 510 of each autopilot controller 23, 24 is divided into 5 areas. The right side is associated with vertical modes, the left side with horizontal and speed modes. This separation was adopted to make the display more clear. The two areas 522, 524 located respectively left and right of an AP softkey 520 display the current sub-mode in progress, vertical on the right and horizontal on the left. Since these sub-modes are not hand-selectable, the two respective areas are not fully touch-sensitive. It is possible to deselect one sub-mode in progress but not to select it by touching these two areas. The screen areas are touch-sensitive for deselection purposes only.

When the autopilot is coupled using soft key 520, selected soft keys 522 and 524, corresponding to horizontal and vertical modes, are displayed in reverse video, as is AP softkey 520. When the AT is coupled, both the AT softkey and a SNAV softkey 526 on display 510, if selected, are displayed in reverse video. At any given instant, there is only one active mode for each axis.

Management of the autopilot is performed in parallel at both right controller 24 and left controller 23. Each modification of status (modes and references) carried out on one controller is immediately passed on to the other. Hence, the autopilot receives only one set of references for speed, slope, course, and ASEL. Nevertheless, an ASEL coupling button 527 on AP controllers 23, 24 is available to allow the crew to choose the right or left barometric setting to which ASEL must refer. The ASEL label is amber framed on the PFD whose barometric setting is not used as the current ASEL reference. It is cyan framed on the PFD whose barometric setting is used as reference.

The autopilot can be coupled by pressing AP soft key 520. When no other modes are selected, pressing this key selects the basic modes of the AP. The basic modes are track holding in the horizontal plane and slope holding in the vertical plane. The autopilot is automatically deselected when a "weight on wheels" signal is received, indicating the aircraft is on the ground, or by any action in pitch, roll or yaw on the control yoke 58, 60 or rudder pedals (not shown).

When no modes have been selected while the autopilot is engaged, the autopilot will control both the vertical and the horizontal plane, and will maintain the values of slope and track present when engaged. The pilot can then adjust these values with multiaxis switch 70 on control wheel 58, 60. Multiaxis switch 70 can be activated left/right to select and store track, and activated up/down to select and store slope values. Pushing the switch 70 when in a center position generates and ENABLE signal and activates the selected stored value.

The Autopilot includes two types of modes: soft-key selectable modes and soft-key non-selectable modes. Table 50 gives a list of the soft-key selectable and non-selectable modes.

TABLE 50

| AXIS | NON SELECTABLE MODES | SELECTABLE MODES |
| --- | --- | --- |
| HORIZONTAL | ROLL (AP coupled) TRK/HDG | LNAV |
| VERTICAL | PATH (AP coupled) ALT ASEL | CLB DESC VNAV |
| HORIZONTAL and VERTICAL | TOGA | APP |

The Horizontal Plane Modes of "ROLL" and "TRK/HDG" of the autopilot are non selectable by using the soft keys. The "ROLL" mode consists of current track holding if the bank angle is less than 6 degrees, and current bank angle holding if the bank angle is greater than 6 degrees. It is the basic horizontal mode of the AP, i.e. the default horizontal mode when the autopilot is coupled. If one higher horizontal mode (TRK/HDG, TOGA, LNAV, APP) that was active is deselected for any reason, the AP returns to the basic horizontal mode ROLL. This mode consists of holding the track or heading after the aircraft is returned to "wing level attitude", if the aircraft was performing a turn when the mode was selected.

The "TRK/HDG" mode consists of a capture and holding of a track, or of a heading if HDG is selected instead of TRK by using Trk/Hdg switch 528. When the AP is coupled without any other lateral mode in progress, any right/left action on multiaxis switch 70 makes the value of the current track increase/decrease. This value is displayed in the HSI of PFD 16, 23 as a cyan readout and marker (bug), and in MFD 18,20 as a cyan line plus cyan bug if HDG is selected. The "TRK/HDG" mode also allows the pilots to define a preselected course. This preselected course can be manually adjusted with multiaxis switch 70, using right and left movements to initiate a proposed new desired aircraft trajectory. Pressing multiaxis switch 70 left makes the course value decrease, pressing right makes it increase. A cyan dashed line giving the analog value of this course is shown in the chart displayed on MFD 18,20, as soon as multiaxis switch 70 has been moved laterally. On the HSI displayed on PFD 16, 22, a cyan bug indicating track or heading is also shown.

When the AP is off, actuating multiaxis switch 70 produces no effect. If the AP is in basic mode in the horizontal plane, and if there is no preselected course, pressing right or left on the multiaxis switch directly adjusts the current desired course. If the AP is in a higher mode, moving multiaxis switch 70 sideways adjusts the preselected course, and causes display of a dashed cyan line indicating the preselected course on the PFD. If the multiaxis switch 70 is then pressed in the central position, it de-activates the higher lateral modes in progress, whether the AP is coupled or not, and it activates the preselected course, thereby changing the desired aircraft trajectory. The cyan line indicating the preselected course then changes from a dashed line to a solid line.

If the AP is not coupled and if there is no selectable mode in progress, pressing the multiaxis switch 70 in the central position displays the preselected FD course bug on the HSI or the current course if no preselected course exists. Table 51 shows the effect of activating multiaxis switch 70 on AP horizontal modes.

TABLE 51

| ACTION | Previous status of track selection | Consequence of action | Status of track selection after action | Status of AP/FD after action |
|---|---|---|---|---|
| Left or right action | No track selected or preselected | Track preselection | Track preselected | As previously |
| | Track preselected | Preselected track modification | Track preselected | As previously |
| | Track selected (TRK mode) | Selected track modification | Track preselected | TRK as previously |
| Central pressing | No track selected or preselected | current track selection | Track selected | TRK |
| | Track preselected | Preselected track activation | Track selected | TRK |
| | Track selected (TRK mode) | Selected track deselecting | No track | IF AP ON: track |

TABLE 51-continued

| ACTION | Previous status of track selection | Consequence of action | Status of track selection after action | Status of AP/FD after action |
|---|---|---|---|---|
| | | | | holding IF AP OFF no lateral FD |

If the AP or FD are not in course capture/holding, and if no preselected course exists, the display of the autopilot when in the "TRK/HDG" mode does not show the track/ heading bug on the HSI nor the cyan line on MFD 18,20. If the AP or FD are not in course capture/holding, but if one preselected course exists, a bug depicted in discontinuous lines and a cyan discontinuous line are respectively displayed on the HSI of PFD 16, 22 and MFD 18,20. If either the AP or the FD are in course capture/holding mode, without any preselected course, a normal cyan bug and a continuous cyan line are displayed respectively on the HSI of PFD 16, 22 and the MFD 18,20.

The following Vertical Plane modes of the autopilot also cannot be selected by using soft keys of display panel 510. These are "PATH", "ALT" and "ASEL".

The "PATH" mode consists of slope holding. It is the basic vertical mode of the AP, and is the default vertical mode available when the AP is coupled. If one of the vertical modes (ALT, TOGA, APP, VNAV, CLB, DESC) that was formerly active is deselected for any reason, the AP returns to the basic vertical mode "PATH." It is also possible to select this mode manually when the AP is coupled, by any fore/aft action on multiaxis switch 70. Moving multiaxis switch 70 fore and aft results in increasing or decreasing the slope of the flight path followed. A corresponding change in the cyan line indicating flight path is displayed on the vertical profile of PFD 16,22

The "ALT" mode consists of a present altitude holding. It is automatically selected when the ASEL mode has captured a selected altitude. It is also possible to activate this mode manually by pressing the ASEL rotary knob 518 of AP controller 22, 24. This will set the ASEL value to the current altitude value. The ASEL value refers to the captain's or the first officer's barometric setting, which can be chosen using the "CPL ASEL" key 527 on the bottom right of AP controller 23, 24. AP controller 23, 24 is fitted with ASEL rotary knob 514 which includes one knob 517 to select multiples of "100 ft" and a second nested knob 516 to select multiples of "1000 ft" values, plus the "ALT" push-button 518. For example, if the present ASEL value is 4500 ft, one action of knob 516 increases the ASEL value up to 5000 ft (and not 5500 ft). The "ASEL" mode is automatically activated when ASEL capture begins, and is automatically deselected when the altitude capture is complete, at which point the AP returns to the "ALT" mode.

When the aircraft is within 300 ft of the selected altitude, the "ASEL" label on AP controller screen 510 starts flashing. From this moment, the AP begins a capture sequence, with a minimum G-load of 0.7 when leveling off from a climb, and a maximum G-load of 1.3 when leveling off from a descent. As soon as the aircraft is within 50 ft from the selected altitude, the "ALT" label is displayed in place of the previous "ASEL" label, and the AP holds that altitude. If ASEL is below the Flight Plan altitude, and is within 1000 ft of it while the aircraft is climbing, the AP will not climb to the Flight Plan altitude but will capture and hold ASEL. If there is a discrepancy between the "ASEL" altitude and the flight plan altitude, while in "climb" mode the AP utilizes the lowest of the values, and while in descent mode the AP utilizes the highest value.

The "TOGA" (take-off—go around) mode is the only mode which provides both a vertical and a horizontal guidance and which cannot be selected using a softkey. It can be selected using a "palm switch" 75 on throttle levers 40. It is automatically set by the FMS computer 63 according to the published procedures of the airfield, as stored in the aeronautical information database, and provides guidance for take-off including ground run, rotation, noise abatement procedures, and go-around in case of a missed approach or wind shear.

Both horizontal and vertical modes of the autopilot can be selected using soft keys. Referring to FIG. 20, the horizontal mode of the autopilot selectable through a soft key 531 of AP display 510 is LNAV (Lateral Navigation). It can be used as soon as a flight plan has been entered and activated. The LNAV mode provides the capability to automatically go from waypoint to waypoint, following the path corresponding to the activated flight plan. This path, computed by the FMS computer 63, is made of lines and arcs of circles, and is displayed in that manner on MFD 18,20. Arcs are computed using the allowed speeds during different phases of flight. These reference speeds are indicated in MFD pages corresponding to each phase of flight (T/O, SID, STAR, APPR, LDG and FPL). If the speeds are not entered, the system will use default values corresponding to a 1.0 g turn if possible. If that is not possible, the arc radius will be limited by a maximum G-load of 1.3, even if that rate of turn causes the trajectory to overshoot the waypoint. When selected, LNAV becomes active when the current position is within 10 miles from the closest point of the flight plan, and the current track is between ±45 degrees of the closest flight plan leg course.

When LNAV carries out an arrival or departure procedure, the name of the procedure is displayed on the AP controller in a window 531 of AP display 510. Possible labels for LNAV sub-modes inside the AP controller are displayed in window 531 below LNAV as "HOLD", "Name of SID", "Name of STAR", "Name of precision approach" in procedure, and "nothing enroute." LNAV can be deselected by performing a lateral action on multiaxis switch 70, by manually disconnecting the mode, and by selecting a precision approach which becomes active.

The vertical modes of the autopilot which are selectable using soft keys in areas 532 and 533 of the AP display 510 are "CLIMB," "DESC," and "VNAV." In the CLIMB mode, if the AT is connected thrust will be adjusted so as to perform the standard climb profile. If the AT is not connected, a current power climb will be performed. If the current power is insufficient to maintain a standard climb profile, the AP will perform a climb following the maximum possible slope. The climb slope must be greater than zero, resulting in a climb even if that causes the speed to decrease. The climb profile with autothrottle engaged consists of a 250 Kts climb below 10,000 ft (at current altimeter setting), followed by a 260 Kts climb, until aircraft reaches M 0.72. These values can be modified after selecting the mode by using SPEED rotary knob 512. The "CLIMB" mode will be deselected when ASEL is captured. The "CLIMB" mode also cannot diverge from the ASEL value, so that if ASEL is set below the current altitude of the aircraft, "CLIMB" mode will be deselected. The CLIMB mode can also be deselected either by pressing once again on soft key 533 or by selecting another vertical mode.

The "DESC" mode lets the aircraft follow a minus 3° slope. If ASEL is specified above the current altitude, the "DESC" mode is deselected and AP holds the current flight path slope. "DESC" can be deselected either by pressing once again on the soft key, or by selecting another vertical mode.

The "VNAV" (Vertical Navigation) mode can be selected using a soft key in area 532 of AP display 510 as soon as the vertical part of flight plan is entered and activated, and LNAV is selected and active. Selecting VNAV without LNAV is meaningless, because it is analogous to selecting a climb (or descent) AP mode. Selecting "VNAV" requires that at least one altitude constraint be contained in the flight plan. Like the LNAV mode, the VNAV mode becomes active only when arriving close to a flight plan path, with a deviation error less than 3 degrees. If these conditions are not complied with, the crew has to make the aircraft converge towards the flight plan's path, by using the basic modes of the AP, before selecting VNAV. VNAV can be deselected by applying a vertical movement to multiaxis switch 70, selection of "CLIMB" on AP controller 23, 24, ASEL diverging from flight plan, an approach becoming active, and ASEL capture outside a 1000 ft range.

The VNAV mode consists of 5 sub-modes, the names of which are displayed in a window 524 located just above VNAV soft key 532 of AP display 510. The sub-modes are: ALT (altitude holding), PATH (slope holding in descent or climb), CLB (predefined climb of 250 Kts–260 Kts–M 0.72), ASEL (altitude selected capture), ALTC (capture of a constraint altitude that is different from ASEL.)

In all circumstances, VNAV is precluded from diverging from ASEL. To prompt the pilot to modify his ASEL according to the next constraint altitude, an amber flashing "ASEL" message will be displayed just beside the current sub-mode of VNAV, 2 minutes before mode change, if ASEL is not appropriately increased for climb and decreased for descent.

Three types of simultaneous horizontal/vertical plane modes can be selected by using the soft keys. These are "ILS precision approach," "MLS precision approach," and "D-GNSS precision approach." A common feature of all precision approaches, whether they are ILS, MLS or D-GNSS, is that the AP allows the aircraft to climb/descent through the ASEL while in this mode. Non-precision approaches like VOR, VOR/DME are performed using LNAV and VNAV modes.

The precision approach modes can be selected by pressing an APP soft key 534 located on AP/AT controller 22, 24. This key will flash if not selected within 2 NM of the initial approach fix (IAF).

The "ILS precision approach" mode may be carried out either with an activation of an approach procedure of the FMS aeronautical information database, or with a manual activation of soft key 534. It can be selected as soon as a precision approach procedure is chosen and activated in the arrival page, or as soon as one MFCU 26, 28 is tuned to an ILS frequency and one course is selected manually. This latter method of selection is only used in abnormal operations.

Once the approach procedure is selected and activated from the FMS database, its name is displayed below the "APP" label shown on key 534. The label can then be selected. As soon as the aircraft is within two miles from a Jeppesen initial approach fix (IAF), APP soft key 534 starts flashing. If APP soft key 534 is not selected, the FMS and the AP will guide the aircraft to the runway axis and follow it until there is a pilot action, even if this causes the aircraft to go past the runway. No automatic descent on the glide slope will be performed by VNAV if APP soft key 534 is not selected. To manually select the approach, the pilot tunes the proper frequency and selects the course, so that the "APP" soft key 534 becomes selectable.

As soon as "APP" is selected on AP controller 23, 24, the G/S and LOC (glide slope and localizer) modes status are displayed below the name of the selected approach in soft key 534. The localizer mode becomes active as soon as LOC deviation is smaller than 0.5 point, where 1 point equals 2.5°. The glide slope becomes active as soon as G/S deviation is smaller than a preset value, for example, 3.0 degrees. If any loss of G/S or LOC reception occurs, the system automatically goes back to basic autopilot mode on the axis for which the reception is lost.

The precision approach mode cannot be deselected by any action on multiaxis switch 70. Instead, the precision approach mode can be deselected manually only by selecting the "TOGA" mode, by deactivation of the approach procedure in the FPL page, or by deselecting the mode on AP controller 23, 24. The precision approach mode can be deselected automatically by activation of another lateral or vertical guidance mode in one axis controlled by the approach mode, and by deactivation of the approach procedure in the ARRIVAL page. Table 52 shows the effect on the guidance modes of disconnecting the approach mode.

TABLE 52

| STATUS | EFFECT |
| --- | --- |
| If LOC or glide were selected but not yet captured | No mode change on the corresponding axis |
| If LOC or/and glide were captured: | |
| AP connected: | |
| ◊ If an other mode has been activated on the corresponding axis | The FD corresponding to the activated mode shall be displayed |
| ◊ Otherwise: | |
| * LOC case | Loss of approach guidance and hence of lateral FD |
| * Glide case | Automatic switch to basic mode (PATH), holding present slope. |
| AP disconnected: | |
| ◊ If an other mode has been activated on the corresponding axis | Auto-pilot following the FD of the activated mode |
| ◊ Otherwise | |
| * LOC case | ROLL mode with track holding (once the aircraft has got back to wing level attitude) |
| * Glide case | Automatic switch to basic mode (PATH), holding present slope |

Autothrottle

The autothrottle (AT) has two basic modes, SPEED and CLIMB, and one higher mode, speed navigation. It is automatically disengaged when a "weight on wheels," condition occurs, just like the AP.

The SPEED mode consists of airspeed holding. A bug, or marker, on the airspeed indicator is set by the crew with knob 512 on the left side of AP/AT controller 23, 24 (FIG. 20). This mode does not depend on the FMS function in progress and operates between the speeds of 100 and 400 Kts.

In case flaps or slats are extended, AT generates its own limiting setting which is not displayed, so as to not exceed the maximum flaps extended speed, $V_{FE}$. $V_{FE}$ corresponds to 190 Kts for 20° of flaps extension, and 180 Kts for 40° of flaps extension. An amber "VFELIM." warning will then be displayed on a soft key 526 of AP display 510 to indicate the condition. The same logic limits speed when the landing gear is extended. The limitation in this case is 170 Kts if the gear is extended, and a warning of "VLGE LIM" is given.

If the crew sets a desired climb slope that is too steep, an amber "THRUST LIM" warning is displayed on soft key 526 of AP display 510 to indicate insufficient engine power to maintain the desired speed during climb.

The higher SPEED NAVIGATION mode can be used whenever any time constraint exists in an active flight plan. It is selected using soft key 526 of AP/AT display 510. This mode sets the speed necessary to reach preselected points at a given time. If the pilot wants to perform this time navigation manually, he has to adjust the engine power indicated by the fan speed N1, so as to obtain a speed enabling the aircraft to reach the waypoint at the desired time.

Head-up Display

A head up display (HUD) 32 is optionally provided at the captain's station. It provides to the pilot the same information which is available from PFD 16, 22 regarding aircraft altitude, speed, flight director, velocity vector and acceleration. The symbology used in HUD 32 is the same as is used in PFD 16, 22.

Databases

Two types of databases are utilized by the present Flight Management System. The first, aeronautical information database, constitutes a digital version of the Jeppesen navigation charts, including high and low altitude enroute charts, STAR approach charts, standard instrument departure charts, and airport maps. These charts and the corresponding digital version include frequencies and identifiers for the navigational aids and air traffic facilities displayed, and other aeronautical information, and are both commercially available from the Jeppesen Corporation. Similar databases are available from other sources, such as government agencies.

The second database is a terrain database, containing digital information on the terrain, particularly elevation of geographical features, and is used by the FMS to compute vertical navigation profiles. A suitable digital terrain database is that used in connection with EGPWS systems.

Flight Phases and Functions

The pilot can display the "FLIGHT PLAN" page, FIG. 21, by using the "FLT PLAN" key in the main menu 122 (FIG. 9), and build a flight plan by appropriate cursor pointing, clicking, and keyboard data entry. FMS computer 63 can automatically propose or compute values, but the pilot always has the ability to force the use of the values he wants. Using the data entered in this page, the system builds a path for take-off, for a standard instrument departure (SID), and for cruise up to final destination airport.

Referring to FIG. 21, a depiction of a FLIGHT PLAN page 552 is shown as displayed on MFD 18,20. FLIGHT PLAN page 552 is divided in two parts. An upper part 554 includes cruise flight plan and corresponding aircraft performance, a lower part 556 of page 552 is related to takeoff and SID path and performance. Neither Standard Terminal Arrival Route (STAR), nor landing performance are displayed or computed through this page, since they are supplied in the "ARRIVAL" page.

Upper part 554 of "FLIGHT PLAN" page 552 further includes a window 560 with 6 labels that allows access to the following options:

NEW (to create a new flight plan)

AUTO (system builds a flight plan automatically once starting and ending points are given, which do not need to be airports.)

MANUAL (pilot builds a flight plan manually, inserting waypoint after waypoint, either with keyboard or graphically with track-ball)

LOAD (load any already build flight plan from CD-ROM into FMS)

AFIS (to load a flight plan from AFIS network)

The six options are mutually exclusive. The crew can prepare a flight plan while in flight, without inducing perturbations to the flight plan currently in use. If a pilot chooses "NEW" while a flight plan is already displayed, the system asks if the latter must be saved prior to starting the "new" plan. The procedure is identical when loading a flight plan from the list, from a CD-ROM, or from the AFIS network.

In addition, the system requires a confirmation when the pilot wants to change building mode from AUTO to MANUAL or from MANUAL to AUTO when he has already entered the flight plan portion of FIG. 21. This in order to avoid awkward erasures of information already entered.

Upper part 554 of "FLIGHT PLAN" page 552 also includes a window 560 for entering the parameters of the flight plan. These are:

origin airport destination airport alternate airport basic operating weight (default value is the previous flight's weight) number of passengers and average weight (default value of passenger weight is 200 lb.)

cargo weight estimated average wind enroute fuel reserves (default value is NBAA but will be suggested by system only if alternate airport has been given previously) fuel on board (At power-on, the value displayed is the value given by gauges. Pilot can modify it manually or choose "AS REQ" value, but in those two cases he must make sure that actual fuel is equal to required fuel, before taking-off.)

desired speed during cruise (long range cruise corresponding to M 0.78, maximum cruise corresponding to M 0.83, or pilot can choose a different value.

cruise level (Default value is "optimum," as computed by FMS computer. Pilot can choose a different value.)

Finally, upper part 554 of "FLIGHT PLAN" page 552 shows a window 562 of FMS-computed parameters, and several labels.

The FMS-computed parameters are the required fuel, shown in red if greater than maximum fuel; the fuel at destination, equal to reserves if pilot has given a fuel on the left part, and displayed in red if less than normal reserves; the time to destination; and the take-off (T/O) weight, displayed in red if greater than MTOW (Max. T/O Weight).

Several labels are displayed in top part 554 of FLIGHT PLAN page 552.

The "SHOW MAP" label is used to call up a corresponding map, which will initially display the entire flight plan.

The "SHOW LOG" label is used to call up the corresponding NAV LOG.

The "STORE" label is used to store this flight plan. It can be selected as soon as a horizontal profile is entered.

An "ACTIVATE" soft key 564 of FLIGHT PLAN page 552 is used to activate the current flight plan, so that it will be regarded by the FMS computer 63 as the current flight plan.

Also displayed is the Standard Instrument Departure (SID) window, where the pilot can select one of the available SIDs of the airport. Once the selection is done, pressing "ACTIVATE" soft key 564 inserts this SID into the flight plan, and on MFD 18,20 the corresponding path is displayed in discontinuous lines. The lines become continuous once LNAV mode is selected and activated.

The default mode for top part 554 of "FLIGHT PLAN" page 552 is the AUTO flight plan mode. In this mode, the crew must enter certain parameters of the flight plan. On MFD 18,20, parameters that must be entered are displayed in cyan dashes when the values have not yet been entered. It is required to enter departure airport, destination airport, and an alternate destination. With this data, the FMS can compute a flight plan from the stored aeronautical information database, choosing the most direct route to go from departure airport to destination, while respecting one-way airways and choosing the appropriate flight levels. As soon as the necessary input items are entered, a "COMPUT" flashing key 566 is displayed on the computation window. Clicking this key launches the computation by FMS computer 63, during which a "COMPUTING" label flashing slowly is displayed in place of "ACTIVATE" softkey 564. Once the computation is completed, it provides the REQUIRED FUEL, FUEL AT DEST, TIME TO DEST, and T/O WEIGHT parameters.

The pilot can store this data using a "STORE" label 568, activate this flight plan with "ACTIVATE" label 564, and call up navigation log and enroute high altitude maps, using respectively the "SHOW LOG" and the "SHOW MAP" labels. Any modifications of the data in the input section of the screen results in erasure of the computation results in the results section, until the pilot again clicks on the "COMPUT" label.

As an alternative to the automatic flight plan mode, the manual flight plan mode page provides the capability to build a flight plan manually. This can be carried out either graphically by clicking on several desired waypoints in the proper order, or by typing the name of waypoints in a list.

Figure 22:
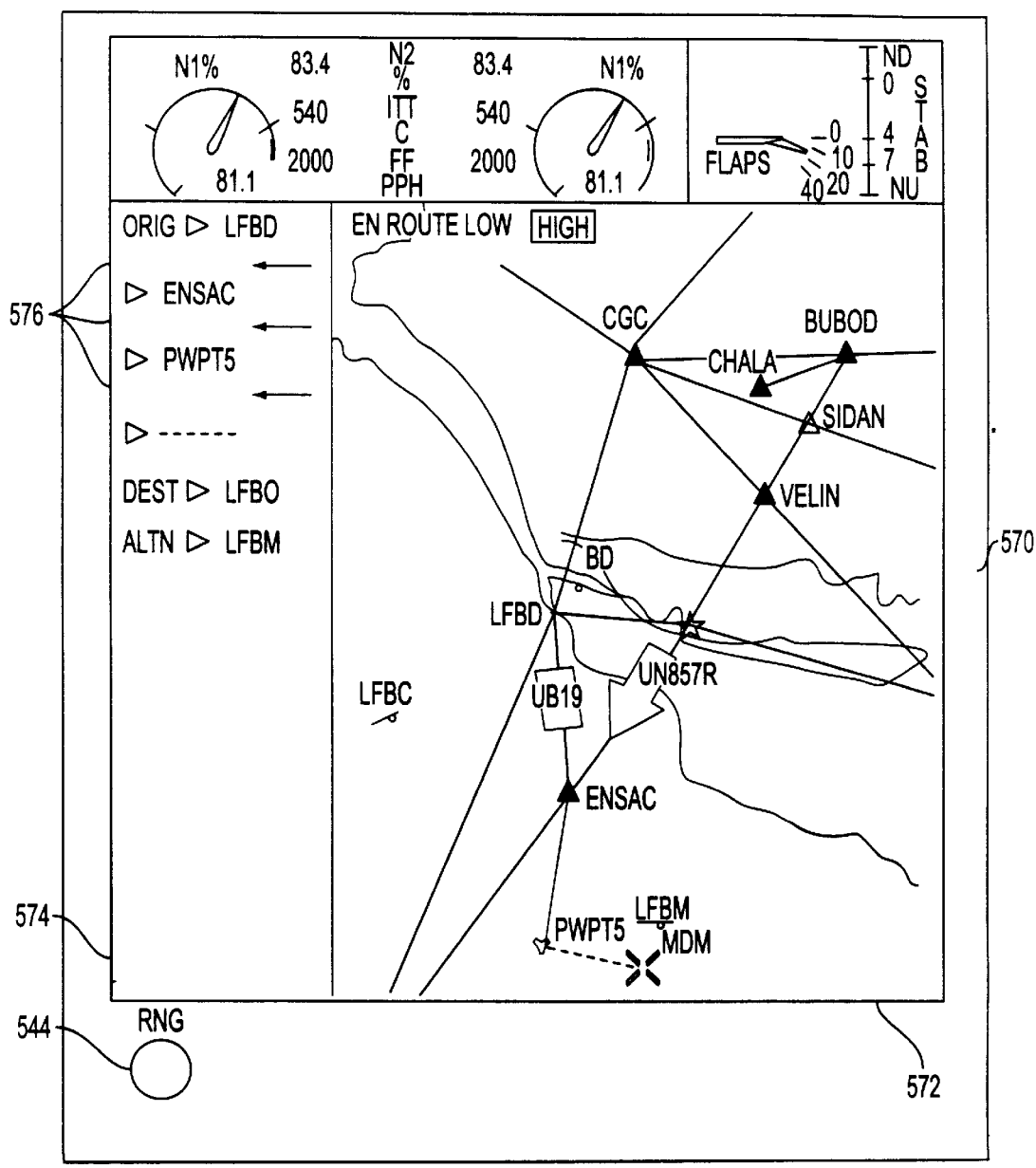
FIG. 22 is a drawing of the MFD displaying a "manual flight plan" page.

Referring to the drawing of MFD 18,20 displayed in FIG. 22, a manual FLIGHT PLAN page 570 has two parts. A right part 572 displays the horizontal situation with enroute high or low altitude chart, north oriented. The choice "HIGH" or "LOW" can be performed thanks to two devoted soft-keys. No sensor symbology is displayed. Range-scale is automatically adjusted so as to display both the origin and destination airports if they have been specified. Otherwise, the chart will be centered on the aircraft position in a 120 NM range-scale. The chart can be adjusted by the crew using standard controls.

In the right part 572 of the page, a flight plan can be built by clicking on waypoint after waypoint (or airway) on the chart. At the beginning of the process, a simple cyan line joining origin airport to destination airport is displayed. The pilot then clicks on the first desired waypoint on the chart. That is, the pilot moves trackball 44 to cause computer 63 to generate and move a cursor across the various symbols displayed on the chart of MFD 18,20 to the first desired waypoint. When this waypoint is selected by pressing selection button 48, the usual information window for this waypoint is displayed nearby, but with the following differences: The cursor is put on "VIA TO" label, and the "DIR TO LNAV" and "DIR TO LNAV/VNAV" labels are not displayed. Clicking on the "VIA TO" label makes the corresponding window disappear, and portions of data from the aeronautical information database corresponding to the selected waypoint are stored in memory and recorded as the next sequential waypoint in the flight plan. It is also possible to click on and select a point that is already recorded in the flight plan, to erase it with the "DELETE" key, or to insert a modification to the flight plan from there with the "VIA TO" key.

A left part 574 of the page is used to type in waypoints with keyboards 34, 36. It provides short windows giving name of origin, destination and alternate airports, if they have been filled in the FLIGHT PLAN page. If not, instead of the OACI code of the airport, cyan dashes are displayed. At least origin and destination points have to be filled in, before the pilot may proceed further. Once that is done, the pilot can enter the name of the first intermediate waypoint (or airway) with the keyboard. As soon as this is achieved, a second empty window appears, and the cursor is automatically put on it. This procedure can continue through all waypoints. Between each pair of contiguous waypoints, a small arrow 576 is displayed. The pilot just has to click on it to make the next empty window appear. By doing that, the pilot can insert a new waypoint between two contiguous points. If the pilot wants to cancel an insertion, he just has to use the "CLEAR" key on keyboards 34, 36, causing the little arrow to be displayed. Otherwise, once the point is inserted, two arrows (one above and one below) are displayed. Thus, the "CLEAR" key provides the capability to cancel a waypoint designated by the cursor. It is also possible to replace the waypoint with another by clicking on it, and by typing the name of the new waypoint in its place.

A flight plan can be built in both the left part 574 and the right part 572 of manual FLIGHT PLAN page 570, or by alternating the two procedures. Each modification or insertion carried out in one of the windows immediately passes on to the other, even if the modification causes the display of the horizontal situation to be centered on the waypoint which has just been inserted. No automatic range-scale adjustment is performed by this process.

If an airway is selected, the system automatically recognizes it, and computer 63 adds an "UP TO" label before the successive empty window. Using this label, the pilot may directly enter the final waypoint to indicate how far to follow the airway, avoiding the need to enter the names of all other waypoints along that airway.

Any modification performed in "manual" mode re-launches a "compute" inside the FLIGHT PLAN page. From the moment the engine fan speed $N_1$ surpasses 80%, this page can no longer be modified, except by choosing the "New" option of the flight plan.

The FLIGHT PLAN page (FIG. 21) has a "FPL LIST" key which permits access to the "FLIGHT PLAN list" page. It is displayed in place of the upper part of FLT PLAN page. This page provides an access to the list of stored flight plans and permits the pilot to display, activate, or erase them. Each flight plan is displayed on one line with its storage name. Only the flight path part related to the enroute air traffic system, is stored. Departure, arrival, and approach information is not stored, because it depends too much on daily traffic and meteorological conditions, and is not usable from one day to the next.

Selection of a flight plan is made with a track-ball and an "ACTIVATE" soft key. A "RETURN" soft key allows access to flight plan performance without selecting any flight plan. If the crew requests a flight plan other than the one already activated, the system asks for confirmation of the selection with the following message:

"Replace active flight plan"

YES/NO/ SAVE CURRENT BEFORE

If a new flight plan is selected, the previously active one is stored.

A "SHOW LOG" soft key permits call-up of the NAV LOG of a selected flight plan on to the MFD, without activating it.

The LOAD soft key allows loading of a flight plan that has been prepared on a CD-ROM or disc.

The "AFIS" soft key permits loading a flight plan transmitted by the AFIS DATALINK, including enroute meteorological forecasts and aircraft performance.

Lower part 556 of "FLIGHT PLAN" page 552 (FIG. 21) provides information about take-off and departure. The take-off and departure information includes the runway parameters of the departure airfield, such as QFU (a list of runways of the departure airport, which the pilot chooses by clicking on the corresponding soft key), length of runway, runway slope, and elevation (automatically supplied once QFU is selected), pressure altitude, obstacle height and distance from runway, wind direction and velocity (must be entered, no default values exist), temperature on ground (must be entered, no default values exist), flaps position (default value is 20°), anti-ice status (default value is off), runway surface status (Dry or wet, regardless of snow, ice and slush problems. Default value is dry.), takeoff procedure (normal or reduced power).

Lower part 556 of FLIGHT PLAN page 552 also contains a window 580 of computed parameters. These are maximum weight, BFL, V1, V2(=Vr), $V_{FR}$, $V_{FT}$, acceleration at 20 Kts, N1 reduced, LOC track, and TOSA (take-off safety altitude). Also in the lower part of the FLIGHT PLAN page are an ACTIVATE key 582, the transition altitude, and a REVIEW choice of different existing departure procedures, a "more" label if more than 4 SID's exist, a REVIEW key, and an ACTIVATE key.

Once the values of upper part 554 of "FLIGHT PLAN" page 552 are keyed-in, the crew can choose a take-off runway in lower part 556 of FPL page 552. For a database-known airport, clicking one of the proposed QFU's causes all the corresponding parameters of the runway to be automatically displayed. These are LENGTH, SLOPE, ELEVATION and OBSTACLES. With current atmospheric pressure, and with airport elevation (database known) the system automatically computes the local departure parameters, which must be checked by the crew. Items which must be entered are displayed with cyan dashes until they have been entered. These include wind direction and velocity, and temperature on the ground. With this data, the FMS computer 63 can compute take off parameters. As soon as the necessary items are entered, a "COMPUTE" flashing key 586 is displayed on the left side of the computation window. Clicking this key launches the computation by FMS and makes the ACTIVATE key flash. Note that this ACTIVATE key is displayed as soon as the information in one of the lines of the upper part is entered. Once the computation is completed, it provides the following parameters:

MAX WEIGHT

BFL (in meters and feet. If BFL>runway length, both BFL & runway length are red).

$V_1$ (can be modified but must remain within aircraft's limitations)

$V_r$ (can be modified but must remain within aircraft's limitations)

$V_2$ (can be modified but must remain within aircraft's limitations)

$V_{FR}$ (can be modified but must remain within aircraft's limitations)

$V_{FT}$ (can be modified but must remain within aircraft's limitations)

ACCELERATION AT 20 KTS

ATTITUDE (required pitch for takeoff)

N1 REDUCED (for reduced power T/O)

LOC TRACK (runway true heading in 1/10 degree, it is displayed as soon as QFU is chosen)

TOSA (displayed as soon as QFU is chosen)

The computed value of "acceleration at 20 Kts" is known as $J_{ref}$ and causes the current value of acceleration in the ADI (attitude direction indicator) to be displayed in green or in flashing amber. The display will be in flashing amber if acceleration is less than $J_{ref}$, engine fan speed is greater than 80%, and ground speed is less than 40 Kts. Once this occurs, the display will remain flashing amber as long as engine fan speed is greater than 80%, and the wheels support the aircraft's weight. If the above conditions are not true, the acceleration on the ADI will be displayed in green. Clicking on the flashing ACTIVATE key causes all cyan values to be displayed in green, displays the speed bugs on speed scale of the ADI, activates the color logic for acceleration, allow TOGA mode, displays $N_{1\ reduced}$ bug on $N_1$ scale if crew has chosen a reduced power takeoff, and sets the AWO (all weather operations) symbology of HUD 32.

A "SID" (standard instrument departure) label on the flight plan page (FIG. 21) allows the pilot to choose the departure procedure. If departure airport has more than 4 SIDs, a "MORE" label lets the pilot choose four more SIDs until all have been displayed. The choice of SID can be performed before or after inserting the take off parameters. This departure will be included in the flight plan path, and will configure the radio-navigation sensors in the HSI. The pilot can activate the selected SID with the ACTIVATE key in the SID window. A REVIEW key, which appears as soon as the SID is chosen, displays the SID on the horizontal situation indicator in map format, with an appropriate scale-range that offers a global vision of the SID, and a path which is displayed cyan if the SID is not activated, and green and yellow if it is activated. The SID is also displayed in the vertical profile.

Once the SID is chosen, the pilot can directly call up the corresponding navigational chart on MFD 18,20 by clicking on the "SID MAP" key in main menu. The same information is available for the airport map, which is called up by using "APT MAP" key. If a take off runway has not been selected, a special message "NO RUNWAY SELECTED FOR T/O" is displayed.

If it is not possible to take-off because the runway is insufficiently long, or the obstacle is too high, a red boxed "IMPOSSIBLE TAKE-OFF" appears instead of an ACTIVATE label. The BFL, length, and maximum weight are displayed in red, until one of the input parameters is modified.

Once the flight plan is entered and the flight progresses, flight computer 63 receives inputs from the GPS, IRS, and other navigation devices to establish current position of the aircraft in relation to flight phases of a stored flight plan. Moreover, computer 63 responds to transition of the aircraft from a position corresponding to one flight phase to a position corresponding to another flight phase by automatically displaying map and aeronautical information database information corresponding to the new flight phase.

Figure 23:
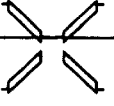
FIG. 23 is a drawing of the MFD displaying an "arrival" page.

Referring to the drawing of MFD 18,20 shown in FIG. 23, an ARRIVAL page 600 of the flight management system can be displayed using the "ARRIVAL" label in the main menu 122 of MFD 18,20. It is basically very similar in its design to FPL page 552 described above. Whereas FPL page 552 is basically used during initialization and at the beginning of a flight, the ARRIVAL page 600 is related to the last phases of flight, including STAR (standard terminal arrival route), approach and landing. The format of this page consists of two parts. These are a runway and procedure part 602, at the top of the page, whereby one can choose the landing runway, the arrival procedure and the approach; and a performance part 604, at the bottom of the page, whereby one can insert data for the computation of landing performance.

Runway and procedure part 602 provides for:

choice of the runway for the destination airport;

choice of STAR;

choice of transition;

choice of approach with a default choice of an ILS approach if available and of a "VFR" approach if not;

a "REVIEW" softkey, an ACTIVATE softkey;

$V_{RF}$ (the bug corresponding to this airspeed is displayed on the speed tape when approach is activated and range to destination is less than 30 NM); and DH & MDA window.

If the publication of the selected approach includes values for decision height (DH), they are automatically filled, unless they have already been filled by the crew. They can be erased so as to inhibit corresponding alarms. DH is related to a precision approach and MDA (minimum descent altitude) is related to a non-precision approach. Nevertheless, the pilot can always set a value of MDA, even for a precision approach. If the DH (MDA) is filled in this window, the corresponding readout will be displayed in both the ADI and the HUD as soon as the radar altimeter indicates below 2500 ft. The DH (MDA) annunciation shall be displayed in both the ADI and the HUD as soon as the radar altimeter indicates below the value entered by the pilot.

Landing performance part 604 of the page includes fields for the following parameters:

length of runway in meters or feet, displayed automatically once QFU is selected;

runway slope given in percentage, displayed automatically once QFU is selected;

runway elevation, automatically displayed once QFU is selected;

QNH;

wind direction and velocity;

temperature on ground;

landing weight;

engine status for landing;

flaps position (40 or 20°, 40 being the default value);

air brakes position (retracted or half-extended, retracted is the default value);

anti-ice status (default value is off);

LFL factor; and

ACTIVATE label.

Additionally, "landing performance" part 604 of the page includes a window 606 containing a list of "COMPUTED PARAMETERS." As soon as the necessary preceding items are filed, a "compute" key 608 appears on the left side of this window. Clicking it launches the computation of the following parameters:

maximum weight;

LFL $V_{GA}$ (Go around speed, with the corresponding flaps position. The corresponding bug is displayed on the speed tape when the approach is activated and the range to destination is less than 30 NM);

"LOC track" for HUD approach, automatically filled as soon as QFU is chosen but can be adjusted manually;

"HUD slope" for HUD approach, automatically filled as soon as QFU is chosen. It gives the slope of ILS if available for the selected QFU, and a 3 degrees slope if not. It can be adjusted manually and the corresponding value is automatically passed on the MFCU; and runway elevation.

When a runway and an ILS approach are selected on "arrival" page 600 (FIG. 23), and if ACTIVATE soft-key is selected, the APP soft-key 534 of the AP (autopilot) controller 22, 24 (FIG. 20) becomes selectable if it was not already selected. The name of the activated approach is displayed in the APP soft-key 534.

If a runway and a non-precision approach are selected, and if the ACTIVATE soft-key is selected, the APP soft-key of the AP controller becomes selectable. The name of the activated approach is displayed within the LNAV soft-key 531.

Activation of an ILS approach causes the multi functional displays (MFD) 18, 20 to display the LOC (localizer) axis as a white dotted line that starts at the runway threshold and is 10 miles long, using the scale of the currently displayed chart. The localizer line is displayed below the line representing the flight plan, if it exists.

With the ILS approach activated, the MFD's 18, 20 also show the approach glide slope, known from the aeronautical information database, in the vertical profile depicted as a white dotted line that reaches the runway threshold and is 10 miles long.

In case performance of the aircraft is insufficient to perform the specified landing, a red boxed flashing message is displayed above ACTIVATE label, indicating "ILLEGAL LANDING" if:

(LFL>LENGTH) AND (LFL/LFL factor<LENGTH) AND (SLOPE SUFFICIENT)

and displaying "IMPOSSIBLE LANDING" in other cases when aircraft performance is insufficient for landing.

In each case, the corresponding parameters are displayed in red. Inserting new values of these parameters erases the red message and erases the results in the computation window. Note that the ACTIVATE label is not displayed when "IMPOSSIBLE LANDING" is indicated.

Reconfiguration of the approach procedure can also be performed. Approach procedure reconfiguration can be split in two categories depending, on whether a runway change is needed or not.

Reconfiguration without any runway ranges, occurs when an approach had been selected though arrival page 600, and the pilot only wishes to change STAR, the transition altitude, or the approach to the same runway. Reconfiguration with runway change occurs when either the pilot selected an ILS frequency and course through MFCU 26, 28, and now wishes to selected an approach through the arrival page 600, or when he selected an approach through the arrival page, and now wishes to change the runway. If there is no runway change, the pilot simply selects the desired STAR, transition, or approach in the arrival page and clicks on the ACTIVATE soft-key.

In case the selection of another runway is needed for the approach reconfiguration, the pilot selects the new runway in the runway/procedure part 602 of arrival page 600, to obtain the following changes within the arrival page:

In the "runway/procedure" part 602, any STAR activated before performing the runway change will remain selected (but not activated) if it belongs to the list of available STAR's for the new runway, otherwise no STAR will be selected.

The selected default approach will be the ILS if available, otherwise a VFR approach. If an approach had been activated before runway change, it will be de-activated and deselected.

In performance part 604 (FIG. 23), data related to the new runway will be displayed, and data that must be entered by the crew (QNH, wind, temperature) will retain its previous value.

After these changes are made, the pilot can select the STAR and/or the approach in the runway/procedure part 602 of arrival page 600 and click on the <<activate>> soft-key, which will cause the runway and approach to be activated.

A deactivation of the approach procedure will be automatically performed when one of the following events occurs: a destination change if the approach procedure had been prepared though the ARRIVAL page 600, weight on wheels, approach reconfiguration, and manual tuning of VOR frequencies on both MFCU 26, 28.

When the approach procedure is deactivated, the approach mode on AP controller 22, 24 is also deactivated and no longer selectable. The approach symbology will be erased, and the "APP" key of AP controller 22, 24 will be colored cyan.

If the pilot tunes MFCU 26, 28 to a VOR frequency when an ILS approach is selected, the approach symbology or the corresponding PFD 16, 22 will be erased. The course displayed within the "CRS" readout of the corresponding MFCU 26, 28 will also be erased, but the approach procedure will not be de-activated.

If the pilot tunes both MFCU's 26, 28 to a VOR frequency, the approach procedure that had been prepared through the arrival page will be deactivated. The approach mode will be erased on both PFD 14, 20 and the "APP" soft key of the AP controller 22, 24 will become unselectable and colored cyan.

If pilot tunes one MFCU 26, 28 to another ILS frequency, the approach procedure that had been prepared through the arrival page will not be deactivated nor disengaged (if it was selected) and will remain selectable (if it was not selected). The ILS symbology remains available on both PFD 14, 20 but each one will refer to the ILS frequency tuned on the respective MFCU 26, 28. In addition, on the PFD 14, 20 corresponding to the side where the new ILS frequency was tuned, preselected course and information displayed right of the HSI will flash slowly, so as to indicate the discrepancy. Despite the discrepancies, the autopilot and flight director 90 will continue to hold the ILS approach that was foreseen by the approach procedure prepared in the arrival page, which is still active.

If the pilot tunes both MFCU 26, 28 to another ILS frequency, the approach procedure that had been prepared from the arrival page will not be deactivated but the approach mode will no longer be selectable. The ILS symbology will remain available on both PFD 14, 20, but each one will refer to the respectively tuned ILS frequency. In addition, the preselected course and information situated to the right of the HSI of both PFD will slowly flash so as to indicate the discrepancy of frequencies tuning.

If the pilot wants to prepare an approach through MFCU 26, 28, he will have to de-activate the approach prepared in arrival page 600 to be prompted for an MFCU-prepared approach. If the pilot wants to return to the approach prepared in the arrival page 600, he must tune both MFCU 26, 28 to the planned frequency to make the approach mode selectable.

While in flight, the crew can modify one or more of the input data to update wind conditions or to display consequences of a cruise Mach number change or level change. As soon the "COMPUT" label is clicked, the system recomputes the unchanged initial parameters (BOW, PAX, cargo), the new parameters (average wind and/or speed and/or cruise altitude), the present fuel on board obtained from the detotalizer, and the remaining path to destination point.

The crew can directly display the results of the modifications and, if so desired, may activate the flight plan with these new parameters. Note that the ACTIVATE label becomes selectable again as soon as one of the active flight plan's parameters is modified. These modifications, if not activated, are lost as soon as the pilot exits FLIGHT PLAN page 552. The pilot can return to the active flight plan by exiting FLIGHT PLAN page 552 and recalling it using two double clicks on "MENU" key, one to erase the page and the other one to re-display it. Parameters of any active flight plan are displayed green. If the flight plan has not been activated, the parameters are displayed magenta to make clear that the flight plan shown is not activated.

The pilot can operate the flight plan functions graphically on the MFD display 16, 18 using track-ball 44, 46 and "ACTION" push-button 48, applied to the manual flight plan page, FIG. 22. Using these devices, the pilot can consult all symbols currently displayed on the screen to get information about them, modify the flight plan and the constraints for vertical navigation, create holding patterns, and can display and tune radio or radio-navigation frequencies. The pilot simply makes the cursor capture the symbol or pertinent point of the image, and pushes on "ACTION" push button 48. This displays a window including available information and possible choices. This window may include the name of symbol (at the top of the window); a sub-menu indicating the symbol's options (WPT, HOLD/NAVAID, RWY, coordinates) just below the name; corresponding information, parameters to be filled, and soft keys specific to the point selected; and flight plan modification keys on the left of the sub-menu.

This window can be erased either by clicking on another symbol or by clicking on a blank area of the screen. In the latter case, the cursor automatically returns to the designated point. There are three categories of symbols: those that belong to the flight plan, those that do not belong to the flight plan, and aircraft symbols.

In the vertical profile (e.g., 546, FIG. 12), the pilot can only modify altitude and slope constraints on a waypoint. When a waypoint is highlighted by operation of the cursor and selection button 48 and a vertical parameter is inserted into the window, the vertical parameter is stored, along with portions of the aeronautical information database memory as a part of the flight plan. In addition, a vertical profile is immediately displayed, if not already displayed, to provide a graphical indication of the vertical flight path of the flight plan. Correspondingly, movement of the cursor to a waypoint in a displayed vertical profile and subsequent operation of the selection button and keyboard is operative to modified stored vertical parameters of the flight plan.

In the horizontal situation, for all categories of symbols except aircraft and airways, the pilot can select the following functions appearing as choices in a window displayed in MFD 18,20 below the selected symbol: DIRECT TO LNAV, DIRECT TO LNAV/VNAV, VIA TO, DELETE, HOLD, CONSTRAINTS, EXIT XXX, CLICK OUTSIDE.

Interactive Charts

As noted above, clicking on a waypoint displayed on a chart results in a small window display for the waypoint. The options selectable from this window are as follows:
DIR TO LNAV This is the classical "direct to" function of previously existing FMS systems. It operates only in the horizontal plane. Nevertheless, if the waypoint has no altitude constraint, a default value equal to ASEL (altitude selected) will be taken into account. Computer 63 thus displays graphical indications on the MFD of geographic locations of waypoints and the current geographic position of the aircraft with respect to the waypoints. Computer 63 responds to operation of trackball 44 and selection button 48 to highlight a waypoint and to implement a "direct go-to" operation by providing a graphical indication of the aircraft trajectory required to proceed direct to the selected waypoint. Moreover, computer 63 responds to selection of a "direct go-to" operation by retrieving terrain data from the geographic database and displaying the vertical terrain profile between the current aircraft position and the selected waypoint (FIG. 15). Moreover, a displayed vertical profile will also include a graphical indication of the vertical path of the stored flight plan between the current aircraft location and the selected waypoint, superimposed over the terrain profile. If the designated point belongs to a flight plan, after passing this point the system will resume navigation on the rest of the flight plan. The skipped part of the flight plan is drawn with discontinuous lines.

If the designated point does not belong to a flight plan, even if it exists in the database, the system will not resume navigation according to the rest of the flight plan.

If the pilot performs a "DIR TO LNAV" while no flight plan exists, a new flight plan is created. The new flight plan goes from the aircraft position when selecting the relevant waypoint, to the waypoint selected.

By providing the Direct To function in this graphical manner, the pilot has greatly increased situational awareness. The pilot sees the current location of the aircraft on a map and sees the relative location of the waypoint to which the pilot is directing the aircraft. The waypoint is not merely a three-letter abstraction, but a specific geographic location whose relationship to the current aircraft position can be readily seen. The pilot therefore has increased relational information, reducing the probability of an unintended unsafe command to the autopilot.
DIR TO LNAV/VNAV This function performs a "direct to" in both the vertical and horizontal planes. The designated point must have an altitude constraint. If not, the pilot has to provide it, or the system will take into account a default value equal to current ASEL value. A read-out with cursor on it will be displayed to prompt altitude entry. In addition, a special label will provide the capability to use ASEL as the altitude constraint. If the required action is not performed, a special message "MODIFICATION NOT TERMINATED" will be displayed. When the pilot performs a "DIR TO LNAV/VNAV", both the LNAV and VNAV become selectable if not already selected, and remain in the same status (selected or not selected) if that status was already selected.
VIA TO This function allows building a flight plan graphically, waypoint after waypoint, or to modify the current flight plan. If the first point on which this function is performed is a flight plan point not yet reached, the preceding part of the flight plan is kept. If not, this point will become a "TO" waypoint as soon as the modification is activated. After this, the pilot must designate all the waypoints that he wants to fly to, click on the modification key, and click on "VIA TO". At each step, created legs are displayed in discontinuous magenta lines. An ACTIVATE key allows termination of the input procedure. This will activate the new flight plan which is displayed with continuous lines, whereas the previous flight plan is displayed with discontinuous lines. If any point belonging to the flight plan is designated (except the first designated point), the rest of flight plan is kept. If an interruption occurs in the modification process, without any activation, a MODIFICATION NOT TERMINATED message will be displayed. When the pilot performs a "VIA TO", the system supplies a vertical profile based on the altitude of the last waypoint of "VIA TO" if an altitude constraint exists. Otherwise the system will set this altitude constraint at the current value of ASEL. When the pilot performs a "VIA TO", both the LNAV and VNAV becomes selectable if not already so, and remain in the same status (selected or not selected) if they were selectable.

Delete

This function allows deletion of one point from the active flight plan or from the flight plan being built. It is available only in these conditions. The system automatically links navigation between the prior and subsequent points. The skipped part of the flight plan remains displayed with discontinuous lines if this plan was active, but if it was being built the skipped part is erased. When pilot deletes a waypoint on which he was currently performing a "DIR TO (LNAV OR LNAV/VNAV)" the autopilot reverts to basic mode if it was coupled. If it was not coupled, lateral and vertical navigation guidance are lost. In both cases, LNAV and VNAV become unselectable.

Hold

This function sets a holding pattern on the designated point if the point belongs to an active flight plan. Clicking on the "HOLD" option displays a sub-menu that allows to define the features of the holding pattern. These features are the inbound course (default value is arrival track on waypoint), the leg time (default value is 1 NM), the type of entry procedures (direct, parallel, or "tear-drop," the default value is direct), right or left turn (default value is right), and required altitude for the pattern.

For the FMS computer 63 to take this holding pattern into account in navigation, the pilot has to activate it with ACTIVATE key displayed at the bottom of the sub-menu. To exit the holding pattern, the pilot has to perform a "DIR TO" on the following waypoint, or click the "ABORT" key in the sub-menu. The "Hold" function can also be performed on the present position, to do so the pilot has to click on the aircraft symbol with the modification key.

The holding pattern is shown in true scale on the horizontal situation display. In contrast, holding patterns on paper Jeppesen charts are always displayed in a conventional size which does not reflect the real scale.

Constraints

This function operates on a waypoint and allows the pilot to insert constraints for a waypoint belonging to a flight plan (active or being built). Entry of data onto appropriately labeled lines in a displayed CONSTRAINTS window using the keyboard causes the newly entered data to be stored in memory in association with data corresponding to the waypoint in the aeronautical information database to store modified altitude and/or speed/time parameters of the flight plan in memory. The CONSTRAINTS window displays a sub-menu including:

ALT+constraint: Altitude on this point and on the following leg until new constraint SLOPE+constraint: Slope to rejoin the point at the required altitude (default value is ±3°)

SPEED+constraint: Speed from this point up to the following one

DTK+constraint: Desired track to rejoin the point

SXTK+constraint: Offset from this point and up to the following one

FLY OVER Fly over constraint point (Y/N)

"SXTK" line is immediately displayed if aircraft symbol is clicked, to allow immediate activation of an offset.

The pilot can thus modify altitude and speed/time parameters of the flight plan.

EXIT XXX

This function permits the pilot to exit a flight plan following a preset course from a waypoint. Air traffic controllers often ask aircraft to leave or terminate a flight plan by following an accurate course from a waypoint. The crew can perform this instruction by waiting to pass over this waypoint and then using the basic mode of AP (TRK) after having pre-displayed the required course. Alternatively, this instruction can also be carried out by selecting EXIT XXX. The pilot enters a value for the course XXX, and the skipped part of flight plan is shown with discontinuous lines on the display. A discontinuous cyan line is displayed on the horizontal situation display, starting from the chosen waypoint, and continuing on the chosen course. It is possible to return to the initial flight plan at any moment, by clearing the XXX value.

Click Outside Every Point

If the designated point does not belong to a database, it will be given a default name (PWPT1 for the first one) which can be modified by the crew. "DIR TO LNAV" and "VIA TO" options will be displayed simultaneously.

SHOW

The pilot may want to perform a "DIR TO" or "VIA TO" for a point which is not currently displayed on the screen. This often happens when ATC issues a "direct to XXX" instruction. The pilot has to find or display this point very fast, and can use the "SHOW" key of the keyboard by clicking on this key (displays a scratch-pad on MFD), then typing the name of WPT or its coordinates, followed by the "ENTER" key of the keyboard. Computer 63 determines a map scale that will permit simultaneous display of the waypoint and the current aircraft position and by displaying a geographic map display containing the specified waypoint, the current aircraft position, and an identification of the scale of the displayed map.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for managing check lists in an aircraft, comprising:

a memory for storing check list data arranged into a plurality of check lists each containing a plurality of items;

a color flat panel display device;

a multi-position switch;

a sensor system for detecting abnormal conditions each corresponding to one check list; and a flight computer coupled to the memory, display device, switch, and sensor system and responding to:
- an abnormal condition detected by the sensor system by automatically displaying the check list corresponding to the detected abnormal condition; and
- operation of the switch to respective selected positions by scrolling a screen indicator respectively up and down a displayed list on the display device, calling up a menu of check lists if no list is displayed, and displaying the previous check list on a menu;

whereby management of the check list data is provided solely by operation of the multi-position switch.

2. A system as recited in claim 1, wherein the switch comprises an automatic center-return switch.

3. A system as recited in claim 2, wherein the switch comprises two orthogonal two-position center return axes.

4. A system as recited in claim 2, wherein the switch comprises a plurality of momentary-contact positions.

5. A system as recited in claim 1, wherein:

the check list data comprises a three-level hierarchy of data organized into pages;

the computer displays selected ones of the levels of check list data; and the computer responds to operation of the switch by executing functions dependent upon the level of currently displayed check list data.

6. A system as recited in claim 1, wherein:

the lowest level of check list data comprises an instruction level, display of which comprises an ordered list of instruction items;

the computer generates signals to cause a screen indicator to selectively associate with an instruction item of displayed data; and operation of the switch to a specified position while instruction level data is being displayed causes an acknowledgment function to be executed for the instruction item associated with the indicator.

7. A system as recited in claim 6, wherein:

execution of the acknowledgment function stores an acknowledgment indicator in memory for the associated item;

the computer responds to operator input by causing display of information unrelated to the check list function;

the computer responds to subsequent operation of the switch to cause display of the page including the acknowledged instruction item, and generation of a screen indicator positioned at the last acknowledged instruction item.

8. A method for managing check lists in an aircraft, comprising:

storing in a memory check list data arranged into a plurality of check lists each containing a plurality of items;

detecting abnormal conditions each corresponding to one of the check lists;

responding to an abnormal condition detected by the sensor system by automatically displaying the check list corresponding to the detected abnormal condition; and responding solely to operation of a multi position switch to manage display of the check list data on the display device.

* * * * *